United States Patent
Yan et al.

(10) Patent No.: US 11,419,152 B2
(45) Date of Patent: Aug. 16, 2022

(54) COMMUNICATION METHOD, TERMINAL DEVICE, AND NETWORK DEVICE

(71) Applicant: HUAWEI TECHNOLOGIES CO., LTD., Guangdong (CN)

(72) Inventors: Le Yan, Shanghai (CN); Shitong Yuan, Shenzhen (CN); Qinghai Zeng, Shanghai (CN); Wenjie Peng, Shanghai (CN); Tingting Geng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 40 days.

(21) Appl. No.: 16/875,192

(22) Filed: May 15, 2020

(65) Prior Publication Data
US 2020/0281023 A1    Sep. 3, 2020

Related U.S. Application Data

(63) Continuation of application No. PCT/CN2018/111552, filed on Oct. 24, 2018.

(30) Foreign Application Priority Data

Nov. 17, 2017 (CN) .......................... 201711147611.9

(51) Int. Cl.
*H04W 74/08* (2009.01)
*H04W 72/04* (2009.01)

(52) U.S. Cl.
CPC ... *H04W 74/0833* (2013.01); *H04W 72/0413* (2013.01); *H04W 72/0453* (2013.01)

(58) Field of Classification Search
CPC ......... H04W 74/0833; H04W 72/0413; H04W 72/0453; H04W 72/085; H04W 72/042;
(Continued)

(56) References Cited

U.S. PATENT DOCUMENTS 8,427,976 B1    4/2013  Dinan
10,887,813 B2 *  1/2021  Wang ................. H04W 36/305
(Continued)

FOREIGN PATENT DOCUMENTS

CN    101841401 A    9/2010
CN    105409135 A    3/2016
(Continued)

OTHER PUBLICATIONS

CMCC, "Considerations on support of supplementary uplink frequency," 3GPP TSG-RAN WG2 Meeting #99, R2-1709093, Berlin, Germany, Aug. 21-25, 2017, 4 pages.
(Continued)

*Primary Examiner* — Brian T O Connor
(74) *Attorney, Agent, or Firm* — Fish & Richardson P.C.

(57) ABSTRACT

Example communication methods and apparatus are described. One example communication method includes receiving indication information by a terminal device from a network device, where the indication information is used to indicate resource configuration information of a first uplink carrier and/or a second uplink carrier. The first uplink carrier and the second uplink carrier are different uplink carriers in a cell of the network device, and the first uplink carrier and the second uplink carrier are corresponding to one downlink carrier in the cell. The terminal device determines one uplink carrier from the at least one uplink carrier as a target carrier for performing random access based on the resource configuration information of the at least one uplink carrier.

18 Claims, 5 Drawing Sheets

(58) Field of Classification Search
CPC .............. H04W 72/02; H04W 74/0866; H04L 5/0053; H04L 5/0048; H04L 5/001; H04L 5/0094
See application file for complete search history.

(56) References Cited

U.S. PATENT DOCUMENTS

| | | | |
|---|---|---|---|
| 11,064,401 B2* | 7/2021 | Xiong | H04W 36/0058 |
| 11,109,416 B2* | 8/2021 | Kim | H04W 16/28 |
| 11,147,078 B2* | 10/2021 | Chen | H04B 7/0695 |
| 2016/0302225 A1 | 10/2016 | Damnjanovic et al. | |
| 2017/0055187 A1 | 2/2017 | Kang et al. | |
| 2018/0192347 A1* | 7/2018 | Shaheen | H04W 36/36 |
| 2019/0037604 A1* | 1/2019 | Akkarakaran | H04W 74/006 |
| 2019/0141773 A1* | 5/2019 | Kim | H04W 76/30 |
| 2020/0128455 A1* | 4/2020 | Da Silva | H04W 74/004 |
| 2020/0187258 A1* | 6/2020 | Lee | H04W 74/0833 |
| 2020/0329503 A1* | 10/2020 | Da Silva | H04W 72/08 |
| 2020/0359420 A1* | 11/2020 | Chen | H04L 5/0053 |
| 2021/0112591 A1* | 4/2021 | Lee | H04W 74/008 |

FOREIGN PATENT DOCUMENTS

| | | |
|---|---|---|
| CN | 105577338 A | 5/2016 |
| JP | 2014045497 A | 3/2014 |
| JP | 2021509780 A | 4/2021 |
| RU | 2479945 C2 | 4/2013 |
| WO | 2017135803 A1 | 8/2017 |

OTHER PUBLICATIONS

CMCC, "Discussion on design of Msg2 for SUL," 3GPP TSG RAN WG1 Meeting 90bis, R1-1717891, Prague, CZ, Oct. 9-13, 2017, 2 pages.
Extended European Search Report issued in European Application No. 18877862.5 dated Oct. 23, 2020, 12 pages.
ZTE, "Sanechips, Discussion on SUL carrier," 3GPP TSG RAN WG1 Meeting #99bis, R2-1711841, Prague, Czech, Oct. 9-13, 2017, 6 pages.
CMCC, "Considerations on support of supplementary uplink frequency," 3GPP TSG-RAN WG2 Meeting #99bis, R2-1711824, Prague, Czech, Oct. 9-13, 2017, 6 pages.
Office Action in Japanese Application No. 2020526928, dated May 25, 2021, 9 pages.
Zte et al., "Discussion on SUL carrier",3GPP TSG RAN WG1 Meeting #99bis, R2-1710899, Prague, Czech, Oct. 9-13, 2017, 6 pages.
3GPP TS 38.321 V1.1.0 (Nov. 2017),3rd Generation Partnership Project,Technical Specification Group Radio Access Network,NR,Medium Access Control (MAC) protocol specification(Release 15), 64 pages.
Huawei et al., "Remaining issues on the PRACH for SUL",3GPP TSG RAN WG1 Meeting 90bis, R1-1717901, Prague, Czech Republic, Oct. 9-13, 2017, 5 pages.
3GPP TS 38.331 V0.1.0 (Oct. 2017),3rd Generation Partnership Project,Technical Specification Group Radio Access Network,NR-,Radio Resource Control (RRC),Protocol specification(Release 15), 42 pages.
Huawei et al., "WF on initial access with SUL",3GPP TSG RAN WG1 Meeting #90, R1-1715152, Prague, Czech Republic, Aug. 21-25, 2017, 3 pages.
3GPP TS 38.300 V1.2.0 (Nov. 2017),3rd Generation Partnership Project,Technical Specification Group Radio Access Metwork,NR,NR and NG-RAN Overall Description,Stage 2(Release 15), 60 pages.
3GPP TS 38.101-1 V0.2.0 (Oct. 2017),3rd Generation Partnership Project,Technical Specification Group Radio Access Network,NR,User Equipment (UE) radio transmission and reception,Part 1: Range 1 Standalone(Release 15), 35 pages.
PCT International Search Report and Written Opinion in International Application No. PCT/CN2018/111,552, dated Jan. 22, 2019, 14 pages (With English Translation).
Office Action issued in Russian Application No. 2020119784/07(033554) dated Jan. 13, 2022, 16 pages (with English translation).
Office Action issued in Chinese Application No. 201880073663.2 dated Feb. 28, 2022, 23 pages (with English translation).

* cited by examiner

COMMUNICATION METHOD, TERMINAL DEVICE, AND NETWORK DEVICE

CROSS-REFERENCE TO RELATED APPLICATION

This application is a continuation of International Application No. PCT/CN2018/111552, filed on Oct. 24, 2018, which claims priority to Chinese Patent Application No. 201711147611.9, filed on Nov. 17, 2017. The disclosures of the aforementioned applications are hereby incorporated herein by reference in their entireties.

TECHNICAL FIELD

This application relates to the communications field, and more specifically, to a communication method, a terminal device, and a network device in the communications field.

BACKGROUND

A conventional cell includes one downlink carrier and one uplink carrier, and in the conventional cell, a frequency of the uplink carrier is the same as or similar to a frequency of the downlink carrier. However, in a new radio (NR) system, when a high-frequency cell is deployed, an operating frequency band of the high-frequency cell is relatively high and transmit power of a terminal device is relatively low, so that a terminal device located in an edge area of the cell can receive a signal of a base station to which the cell belongs, but the base station cannot receive a signal of the terminal device in the edge area, in other words, uplink coverage and downlink coverage are asymmetric. In addition to an original high-frequency uplink frequency band of the cell, one or more additional uplink frequency bands of lower frequencies may be introduced to send uplink signals, to resolve this problem. The uplink frequency band of the lower frequency may be referred to as a supplementary uplink (SUL) carrier. Because the additional uplink frequency band has smaller signal attenuation, the uplink coverage can be expanded, so that the uplink coverage can be consistent with the downlink coverage. For example, in actual deployment, a 1.8 GHz uplink frequency band, a 3.5 GHz uplink frequency band, and a 3.5 GHz downlink frequency band may be used. However, this is not limited, and a deployment solution of another frequency band may be alternatively used. Therefore, when there are a plurality of uplink frequency bands in a cell, how the terminal device selects a carrier (that is, selecting a resource) when accessing the cell and how a network device performs resource configuration is an issue to be resolved urgently.

SUMMARY

This application provides a communication method, a terminal device, and a network device, so that an uplink carrier can be selected from a cell supporting a plurality of uplink frequency bands, for performing random access.

According to a first aspect, a communication method is provided, including:

receiving, by a terminal device, indication information sent by a network device, where the indication information is used to indicate resource configuration information of at least one uplink carrier, the at least one uplink carrier includes a first uplink carrier and/or at least one second uplink carrier, the first uplink carrier and the at least one second uplink carrier are different uplink carriers in a cell of the network device, and the first uplink carrier and the at least one second uplink carrier are corresponding to one downlink carrier in the cell; and determining, by the terminal device based on the resource configuration information of the at least one uplink carrier, one uplink carrier from the at least one uplink carrier as a target carrier for performing random access.

Therefore, in this embodiment of this application, when the cell (that is, a target cell) of the network device to which the terminal device is to be handed over includes the first uplink carrier and the at least one second uplink carrier, and the first uplink carrier and the at least one second uplink carrier are corresponding to one downlink carrier in the target cell, the network device may send, to the terminal device, the resource configuration information of the at least one uplink carrier including the first uplink carrier and/or the at least one second uplink carrier, so that the terminal device can determine, based on resource configuration information of the at least one uplink carrier, one uplink carrier from the at least one uplink carrier as the target carrier for performing random access.

The communication method in this embodiment of this application may be applied to a handover scenario and a dual connectivity scenario. Specifically, in the handover scenario, the network device is a target network device, and the indication information may be included in a handover request response message and a handover message. In the dual connectivity scenario, the network device is a secondary base station, and the indication information may be included in a secondary station adding request acknowledgment message and an RRC connection reconfiguration message.

It should be understood that the first uplink carrier and the second uplink carrier are uplink carriers with different frequency bands. For example, the first uplink carrier may be an uplink carrier with a high frequency band deployed in a 5G NR system, and the uplink carrier may be referred to as an NR UL carrier, a PUL carrier, a normal UL carrier, or a common UL carrier. The second uplink carrier is an uplink carrier with a low frequency band (for example, in an LTE system or another communications system), and may be used to assist the terminal device in uplink transmission, and the uplink carrier may be referred to as an SUL carrier.

Optionally, the indication information is carried in a reconfiguration message used for synchronization, and the reconfiguration message used for synchronization includes the resource configuration information of the first uplink carrier and the resource configuration information of the second uplink carrier, or the reconfiguration message used for synchronization includes the configuration information of the first uplink carrier or the configuration information of the second uplink carrier.

Optionally, the configuration information of the first uplink carrier includes at least one of a physical uplink shared channel (PUSCH) configuration, a physical uplink control channel (PUCCH) configuration, a sounding reference signal (SRS) configuration, and an uplink power control configuration of the first uplink carrier. The configuration information of the second uplink carrier includes at least one of a physical uplink shared channel (PUSCH) configuration, a physical uplink control channel (PUCCH) configuration, a sounding reference signal (SRS) configuration, and an uplink power control configuration of the second uplink carrier.

Optionally, the resource configuration information includes a dedicated random access resource, and the determining, by the terminal device based on the resource configuration information of the at least one uplink carrier, one uplink carrier from the at least one uplink carrier as a target carrier for performing random access includes:

determining, by the terminal device based on the indication information, the at least one uplink carrier corresponding to the dedicated random access resource; and if the at least one uplink carrier includes one uplink carrier, determining, by the terminal device, the uplink carrier as the target carrier; or if the at least one uplink carrier includes at least two uplink carriers, determining, by the terminal device, one of the at least two uplink carriers as the target carrier.

In this way, when the resource configuration information in the indication information includes the dedicated random access resource, and the dedicated random access resource is corresponding to an uplink carrier, the terminal device uses the dedicated random access resource to perform contention-free random access. Specifically, when there is one uplink carrier corresponding to the dedicated random access resource, the terminal device performs random access on the uplink carrier by using the dedicated random access resource. When there is more than one uplink carrier corresponding to the dedicated random access resource, the terminal device performs random access on one of the at least two uplink carriers by using the dedicated random access resource.

Optionally, the indication information includes a carrier index corresponding to the dedicated random access resource.

The determining, by the terminal device based on the indication information, the at least one uplink carrier corresponding to the dedicated random access resource includes:

determining, by the terminal device, a carrier indicated by the carrier index corresponding to the dedicated random access resource, as at least one uplink carrier corresponding to the dedicated random access resource.

In this way, an uplink carrier corresponding to the dedicated random access resource can be explicitly indicated by using the carrier index.

Optionally, there is a correspondence between the dedicated random access resource and an uplink carrier on which a physical uplink control channel PUCCH resource is configured.

The determining, by the terminal device based on the indication information, the at least one uplink carrier corresponding to the dedicated random access resource includes:

determining, by the terminal device based on the correspondence between the dedicated random access resource and the uplink carrier on which the PUCCH resource is configured, the at least one uplink carrier corresponding to the dedicated random access resource.

In this way, the indication information can implicitly indicate, by indicating the correspondence between the dedicated random access resource and the uplink carrier on which the PUCCH resource is configured, an uplink carrier corresponding to the dedicated random access resource.

Optionally, the resource configuration information further includes a PUCCH resource, and the determining, by the terminal device, one of the at least two uplink carriers as the target carrier includes:

determining, by the terminal device, one of uplink carriers, on which the PUCCH resource is configured, of the at least two uplink carriers as the target carrier.

In other words, when the resource configuration information includes the dedicated random access resource and the PUCCH resource, the terminal device may determine, according to the foregoing manner, at least two uplink carriers corresponding to the dedicated random access resource, and determine the uplink carrier, on which the PUCCH resource is configured, of the at least two uplink carriers as the target carrier.

Optionally, the resource configuration information further includes a common random access resource, and the method further includes:

if the terminal device fails to perform contention-free random access on the target carrier by using the dedicated random access resource, performing, by the terminal device, contention-based random access on the target carrier or another uplink carrier different from the target carrier by using the common random access resource.

Optionally, the resource configuration information includes a PUCCH resource, and the determining, by the terminal device based on the resource configuration information of the at least one uplink carrier, one uplink carrier from the at least one uplink carrier as a target carrier for performing random access includes:

determining, by the terminal device, one of uplink carriers, on which the PUCCH resource is configured, of the at least one uplink carrier as the target carrier.

In other words, in this embodiment of this application, when the resource configuration information does not include the dedicated random access resource, but includes the PUCCH resource, the terminal device may determine the one uplink carrier, on which the PUCCH resource is configured, of the at least one uplink carrier as the target carrier, and perform contention-based random access on the uplink carrier by using the common random access resource.

Optionally, when there is one uplink carrier on which the PUCCH resource is configured, the terminal device determines the uplink carrier on which the PUCCH resource is configured, as the target carrier.

When there are at least two uplink carriers on which the PUCCH resource is configured, the terminal device determines the target carrier based on a measurement result of the cell.

Optionally, the resource configuration information includes a common random access resource, and the determining, by the terminal device based on the resource configuration information of the at least one uplink carrier, one uplink carrier from the at least one uplink carrier as a target carrier for performing random access includes:

determining, by the terminal device, the target carrier from the at least one uplink carrier based on the measurement result of the cell.

In other words, when the resource configuration information does not include the dedicated random access resource or the PUCCH resource, that is, when the resource configuration information includes only the common random access resource, or when the resource configuration information includes the dedicated random access resource, but the network device does not indicate, by using the foregoing explicit or implicit method, an uplink carrier corresponding to the dedicated random access resource, the indication information sent by the network device may indicate the common random access resource of the at least one uplink carrier. The terminal device may determine the target carrier from the at least one uplink carrier based on the measurement result of the cell.

The measurement result of the cell herein includes a measurement result of a downlink reference signal, and the downlink reference signal may include a synchronization signal (SS) (where the SS includes a primary synchronization signal PSS/a secondary synchronization signal SSS) and/or a channel state information reference signal (CSI-RS) and/or a physical broadcast channel-demodulation reference signal (PBCH-DMRS).

Optionally, the determining, by the terminal device, the target carrier based on the measurement result of the cell includes:

if the measurement result of the downlink reference signal is greater than or equal to a threshold, determining, by the terminal device, the first uplink carrier as the target carrier; or if the measurement result of the downlink reference signal is less than the threshold, determining, by the terminal device, the second uplink carrier as the target carrier.

Optionally, the reconfiguration message used for synchronization further includes the threshold, and the threshold is used by the terminal device to determine the target carrier based on the measurement result of the downlink reference signal.

In this embodiment of this application, the threshold may be configured in any one of the following three manners.

(1) A system message of the target network device may include the threshold. The system message is, for example RMSI. The threshold in this application may be the same as a threshold used during initial access, in other words, the threshold included in the system message is unique, and may be applicable to both uplink carrier selection performed during initial access and uplink carrier selection performed during a handover. Alternatively, the threshold may be different from a threshold used during initial access, in other words, the system message includes two thresholds: One is used for uplink carrier selection performed during initial access, and the other one is used for uplink carrier selection during handover. It may be understood that in this case, the handover message in this embodiment of this application does not include the threshold. In this case, the terminal device may select the uplink carrier based on the threshold included in the system message broadcast by the target network device.

(2) The handover message sent by the source network device to the terminal device may include the threshold. Specifically, the threshold may be included in the RMSI, and optionally, the RMSI may be included in the handover message. Specifically, the manner in which the RMSI includes the threshold may be described as the manner (1). In this case, the terminal device may select the uplink carrier based on the threshold included in the handover message.

(3) A value of the threshold may be specified in a protocol.

Optionally, after the terminal device initiates random access on the target carrier in a power ramping manner for X times, or after the terminal device fails to initiate random access on the target carrier for Y times, or after the terminal device sends a random access preamble sequence on the target carrier for Z times, the terminal device performs random access on another uplink carrier different from the target carrier, where X, Y, and Z are all positive integers greater than 1.

According to a second aspect, an embodiment of this application provides a communication method, including:

determining, by a network device, first indication information, where the first indication information is used to indicate resource configuration information of at least one uplink carrier, the at least one uplink carrier includes a first uplink carrier and/or at least one second uplink carrier, the first uplink carrier and the at least one second uplink carrier are different uplink carriers in a cell of the network device, and the first uplink carrier and the at least one second uplink carrier are corresponding to one downlink carrier in the cell; and sending, by the network device, the first indication information, so that the terminal device determines one uplink carrier from the at least one uplink carrier as a target carrier for performing random access.

Therefore, in this embodiment of this application, when the cell (that is, a target cell) of the network device to which the terminal device is to be handed over includes the first uplink carrier and the at least one second uplink carrier, and the first uplink carrier and the at least one second uplink carrier are corresponding to one downlink carrier in the target cell, the network device may send, to the terminal device, resource configuration information of the at least one uplink carrier including the first uplink carrier and/or the at least one second uplink carrier, so that the terminal device can determine, based on resource configuration information of the at least one uplink carrier, one uplink carrier from the at least one uplink carrier as the target carrier for performing random access.

The communication method in this embodiment of this application may be applied to a handover scenario and a dual connectivity scenario. Specifically, in the handover scenario, the network device is a target network device, and the indication information may be included in a handover request response message and a handover message. In the dual connectivity scenario, the network device is a secondary base station, and the indication information may be included in a secondary station adding request acknowledgment message and an RRC connection reconfiguration message.

It should be understood that the first uplink carrier and the second uplink carrier are uplink carriers with different frequency bands. For example, the first uplink carrier may be an uplink carrier with a high frequency band deployed in a 5G NR system, and the uplink carrier may be referred to as an NR UL carrier, a PUL carrier, a normal UL carrier, or a common UL carrier. The second uplink carrier is an uplink carrier with a low frequency band (for example, in an LTE system or another communications system), and may be used to assist the terminal device in uplink transmission, and the uplink carrier may be referred to as an SUL carrier.

Optionally, the first indication information is used to indicate resource configuration information of the target carrier, where the determining, by a network device, first indication information includes: receiving, by the network device, a measurement result of the cell from the terminal device; and determining, by the network device, the target carrier from the at least one uplink carrier based on the measurement result.

Optionally, the measurement result includes a measurement result of a downlink reference signal, and the determining, by the network device, the target carrier from the at least one uplink carrier based on the measurement result includes:

if the measurement result of the downlink reference signal is greater than or equal to a threshold, determining, by the network device, the first uplink carrier in the at least one uplink carrier as the target carrier; or if the measurement result of the downlink reference signal is less than the threshold, determining, by the network device, the second uplink carrier in the at least one uplink carrier as the target carrier.

Specifically, when the target network device supports at least two uplink carriers, the target network device may configure the dedicated random access resource for one of the uplink carriers. Alternatively, when the target network device supports at least two uplink carriers, the target network device may configure no dedicated random access resources but the PUCCH resource for one of the uplink carriers.

Optionally, the resource configuration information includes a dedicated random access resource and/or a PUCCH resource, where the first indication information includes a carrier index corresponding to the dedicated random access resource, and the carrier index corresponding to the dedicated random access resource is used to indicate at least one uplink carrier corresponding to the dedicated random access resource; or there is a correspondence between the dedicated random access resource and an uplink carrier on which a physical uplink control channel PUCCH resource is configured, and the correspondence is used to indicate at least one uplink carrier corresponding to the dedicated random access resource.

Optionally, the first indication information further includes a common random access resource.

Optionally, there may be the following six possible cases in which the target network device configures a random access resource for the terminal device.

(1) The target network device supports two uplink carriers (one common UL carrier and one SUL carrier), and configures a dedicated random access resource for each of the two uplink carriers.

(2) The target network device supports two uplink carriers (one common UL carrier and one SUL carrier), and the target network device configures no dedicated random access resources but a PUCCH configuration for each of uplink carriers.

(3) The target network device supports more than two uplink carriers (one common UL carrier and at least one SUL carrier), and the target network device configures a dedicated random access resource for each of the uplink carriers.

(4) The target network device supports more than two uplink carriers (one common UL carrier and at least one SUL carrier), and a second network device configures a dedicated random access resource for one or some (some of the at least two uplink carriers) of the uplink carriers.

(5) The target network device supports more than two uplink carriers (one common UL carrier and at least one SUL carrier), and a second network device configures no dedicated random access resources but a PUCCH configuration for each of the uplink carriers.

(6) The target network device supports more than two uplink carriers, and the target network device configures no dedicated random access resources but a PUCCH configuration for one or some of the uplink carriers.

Optionally, the network device sends second indication information to the terminal device, where the second indication information is used to indicate that after the terminal device initiates random access on the target carrier in a power ramping manner for X times, or after the terminal device fails to initiate random access on the target carrier for Y times, or after the terminal device sends a random access preamble sequence on the target carrier for Z times, the terminal device performs random access on another uplink carrier different from the target carrier, where X, Y, and Z are all positive integers greater than 1.

According to a third aspect, a terminal device is provided and is configured to perform the method in any one of the first aspect or the possible implementations of the first aspect. Specifically, the terminal device includes units configured to perform the method in any one of the first aspect or the possible implementations of the first aspect.

According to a fourth aspect, a network device is provided and is configured to perform the method in any one of the second aspect or the possible implementations of the second aspect. Specifically, the apparatus includes units configured to perform the method in any one of the second aspect or the possible implementations of the second aspect.

According to a fifth aspect, a terminal device is provided. The terminal device includes a transceiver, a memory, a processor, and a bus system. The transceiver, the memory, and the processor are connected by using the bus system, the memory is configured to store an instruction, and the processor is configured to execute the instruction stored by the memory, to control the transceiver to receive and/or send a signal. In addition, when the processor executes the instruction stored by the memory, the execution enables the processor to perform the method in any one of the first aspect or the possible implementations of the first aspect.

According to a sixth aspect, a network device is provided. The network device includes a transceiver, a memory, a processor, and a bus system. The transceiver, the memory, and the processor are connected by using the bus system, the memory is configured to store an instruction, and the processor is configured to execute the instruction stored by the memory, to control the transceiver to receive and/or send a signal. In addition, when the processor executes the instruction stored by the memory, the execution enables the processor to perform the method in any one of the second aspect or the possible implementations of the second aspect.

According to a seventh aspect, a computer readable medium is provided and is used to store a computer program. The computer program includes an instruction used to perform the method in any possible implementation of any one of the foregoing aspects.

According to an eighth aspect, a computer program product is provided. The computer program product includes computer program code. When the computer program code is run by a communications unit, a processing unit or a transceiver, or a processor of a communications device (for example, the foregoing terminal device or the foregoing network device), the communications device is enabled to perform the method in any possible implementation of any one of the foregoing aspects.

According to a ninth aspect, a communications chip is provided. The communications chip stores an instruction, and when the instruction is run on a communications apparatus, the communications chip performs the method in any possible implementation of any one of the foregoing aspects.

According to a tenth aspect, a communications system is provided. The communications system includes the foregoing terminal device and the foregoing network device.

DESCRIPTION OF EMBODIMENTS

Figure 1:
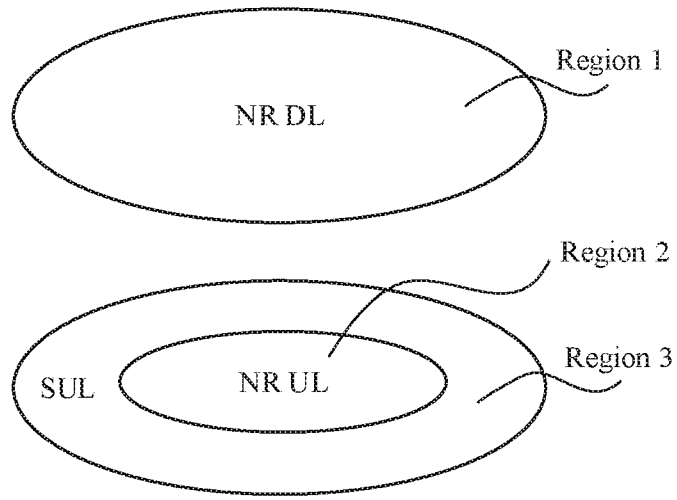
FIG. 1 is a schematic diagram of cell deployment in an NR system according to an embodiment of this application.

The following describes technical solutions of this application with reference to accompanying drawings.

The technical solutions in the embodiments of this application may be applied to various communications systems, for example, a long term evolution (LTE) system, an LTE frequency division duplex (FDD) system, an LTE time division duplex (TDD) system, a universal mobile telecommunications system (UMTS), and a future 5th generation (5G) system, for example, a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like; or may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with a terminal device, may be an evolved NodeB (eNB or eNodeB) in an LTE system may be a radio controller in a cloud radio access network (CRAN) scenario; or may be a relay node, an access point, a vehicle-mounted device, a wearable device, a network device in a future 5G network, a network device in a future evolved PLMN network, or the like. For example, the network device may be a base station device gNB in an NR system. This is not limited in the embodiments of this application.

The source network device in the embodiments of this application is an access network device that a terminal currently accesses or camps on, and the terminal may be handed over from the access network device to another access network device. Correspondingly, the target network device in the embodiments of this application is an access network device to which the terminal is to be handed over.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

In the embodiments of this application, "a plurality of" means two or more than two.

Descriptions such as "first" and "second" in the embodiments of this application are merely used as an example and used to distinguish between different objects, but are not intended to describe a specific order, do not indicate a specific limitation on a quantity of devices in the embodiments of this application, and do not constitute any limitation on the embodiments of this application.

"Connection" in the embodiments of this application includes various connection manners such as a direct connection or an indirect connection, to implement communication between devices. This is not limited in the embodiments of this application.

FIG. 1 is a schematic diagram of cell deployment in an NR system according to an embodiment of this application. In FIG. 1, a region 1 is a downlink coverage area of a high-frequency cell, a region 2 is an uplink coverage area of the high-frequency cell, a size of the region 1 is different from a size of the region 2, and the coverage area of the region 2 is less than the coverage area of the region 1. Specifically, for downlink transmission of the high-frequency cell, transmit power of a network device is usually not limited. Therefore, the network device may use a larger transmit power for sending, to increase a downlink coverage area. However, due to limitation by a maximum transmit power and the like a terminal device cannot increase an uplink coverage area by increasing a transmit power. Consequently, the uplink coverage area of the high-frequency cell is inconsistent with the downlink coverage area of the high-frequency cell. In this embodiment of this application, a downlink carrier in the region 1 may be referred to as an NR downlink (NR DL) carrier, and an uplink carrier in the region 2 is referred to as an NR uplink (NR UL) carrier, a PUL carrier, a normal UL carrier, a common UL carrier, or a non SUL carrier. To describe the method, the following provides description by using the common UL carrier.

A region 3 in FIG. 1 is a coverage area of an SUL carrier, and a coverage area of the region 3 is the same as or similar to the coverage area of the region 1. The SUL carrier has an uplink frequency band with a frequency lower than that of the common UL carrier. Therefore, signal attenuation in the region 3 is smaller than that in the region 2, and the terminal device may send a signal by using relatively low transmit power. In this case, the terminal device has two spectrums for uplink transmission. To be specific, the terminal device may perform uplink transmission by using the SUL carrier and the common UL carrier. In other words, a cell that supports SUL configuration has one downlink carrier and two uplink carriers.

It may be understood that only an application scenario in FIG. 1 is used as an example for description in this embodiment of this application. However, this embodiment of this application is not limited thereto. For example, the cell may further include another SUL carrier, in other words, a terminal device in the cell that supports the SUL configuration may perform uplink transmission by using one common UL carrier and at least one SUL carrier.

Figure 2:
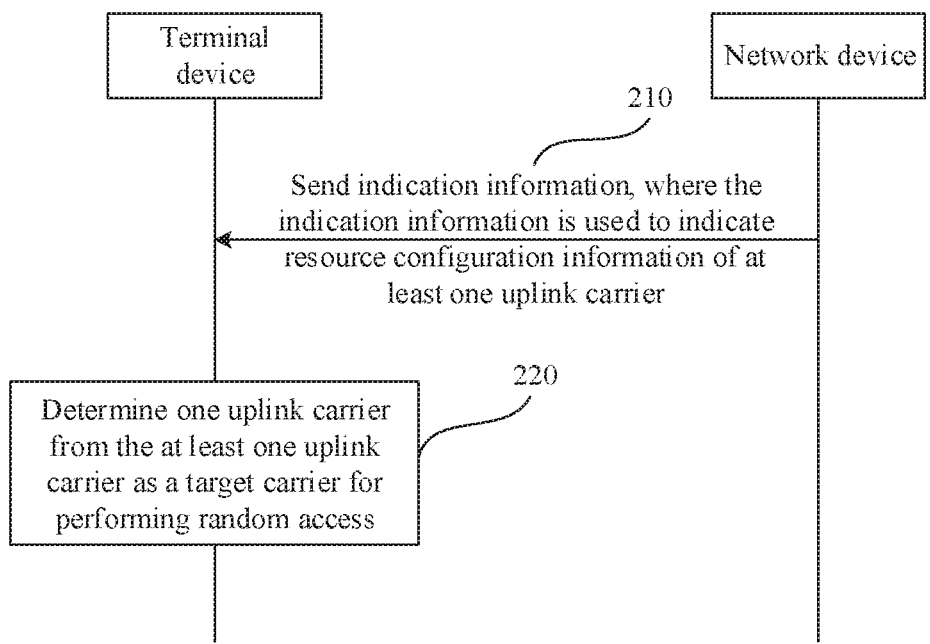
FIG. 2 is a schematic flowchart of a communication method according to an embodiment of this application.

FIG. 2 is an interaction flowchart of a communication method according to an embodiment of this application. The communication method may be used in a process in which a terminal device is handed over from a source base station (source gNB) to a target base station (target gNB). It should be understood that an NR system is used as an example for description in this embodiment of this application, but the technical solution in this embodiment of this application is not limited to a 5G system. In addition, in this embodiment of this application, a network device/the terminal device may perform some or all of the steps in the foregoing embodiment, and these steps or operations are merely examples. Other operations or variants of the operations may alternatively be performed in this embodiment of this application. In addition, the steps may be performed in a sequence different from that presented in the foregoing embodiment, and possibly, not all the operations in the foregoing embodiment need to be performed.

210. The network device sends indication information to the terminal device, where the indication information is used to indicate resource configuration information of at least one uplink carrier.

The network device herein is a target network device or a source network device. The target network device may be a target base station, namely, the foregoing target gNB, and the source network device may be a source base station, namely, the foregoing source gNB. Specifically, the indication information may be included in a handover request acknowledgement message sent by the target network device to the source network device. The source network device sends a handover message to the terminal device. The handover message includes the indication information. In other words, the target network device may first send the indication information to the source network device, and then the source network device transparently transmits the indication information to the terminal device.

In other words, in this embodiment of this application, the indication information may be included in a handover response acknowledgement message and the handover message. Specifically, the handover message may be a radio resource control (RRC) connection reconfiguration message including mobility control information (mobility control info), or another message used to instruct the terminal device to be handed over to/change a serving cell/synchronize reconfiguration.

Specifically, the terminal device reports a measurement report to the source network device, and the source network device performs handover determining based on the measurement report reported by the terminal device or based on other information, and determines the target cell to which the terminal device is handed over. Then the terminal device sends a handover request message to the network device (the target network device) to which the target cell belongs. After performing admission control (for example, configuring a resource) based on the received handover request message, the target network device replies the source network device with the handover request acknowledgement message. After receiving the handover request acknowledgement message, the source network device sends the handover message to the terminal device.

In this embodiment of this application, the at least one uplink carrier is an uplink carrier in the target cell to which the terminal device is to be handed over, namely, an uplink carrier in a cell of the target network device to which the terminal device is to be handed over. In addition, more specifically, the at least one uplink carrier includes a first uplink carrier and/or at least one second uplink carrier, the first uplink carrier and the at least one second uplink carrier are different uplink carriers in the target cell to which the terminal device is to be handed over, and the first uplink carrier and the at least one second uplink carrier are corresponding to one downlink carrier in the target cell.

It should be understood that the first uplink carrier and the second uplink carrier are uplink carriers with different frequency bands. For example, the first uplink carrier may be an uplink carrier with a high frequency band deployed in the NR system, namely, the NR UL carrier, the PUL carrier, the normal UL carrier, or the common UL carrier described above. The second uplink carrier is an uplink carrier of a low frequency band (for example, in an LTE system or another communications system), and may be used to assist the terminal device in uplink transmission, namely, the SUL carrier described above. Therefore, in this embodiment of this application, the terminal device may have two spectrums for uplink transmission, and a coverage area of the first uplink carrier is less than a coverage area of the second uplink carrier. Specifically, for description of the coverage area of the first uplink carrier and the coverage area of the second uplink carrier, refer to the description in FIG. 1. To avoid repetition, details are not described again.

In addition, in this embodiment of this application, a downlink carrier, a first uplink carrier, and at least one second uplink carrier are configured in the target cell, and the first uplink carrier and the at least one second uplink carrier are corresponding to one downlink carrier in the target cell. It may be understood that a coverage area of the downlink carrier is the same as or similar to a coverage area of one of at least one SUL carrier corresponding to the downlink carrier. For example, when there is only one SUL carrier, the coverage area of the downlink carrier is the same as or similar to the coverage area of the SUL carrier. In addition, a frequency band of the downlink carrier is the same as or similar to a frequency band of the first uplink carrier, and the at least one second uplink carrier is a carrier used to assist the terminal device in uplink transmission, where a frequency band of the at least one second uplink carrier may be lower than that of the downlink carrier or the first uplink carrier.

Optionally, the indication information is carried in a reconfiguration message used for synchronization, and the reconfiguration message used for synchronization includes configuration information of the first uplink carrier and configuration information of the second uplink carrier, or the reconfiguration message used for synchronization includes configuration information of the first uplink carrier or configuration information of the second uplink carrier.

Optionally, the configuration information of the first uplink carrier includes at least one of a physical uplink shared channel (PUSCH) configuration, a physical uplink control channel (PUCCH) configuration, a sounding reference signal (SRS) configuration, and an uplink power control configuration of the first uplink carrier. The configuration information of the second uplink carrier includes at least one of a physical uplink shared channel (PUSCH) configuration, a physical uplink control channel (PUCCH) configuration, a sounding reference signal (SRS) configuration, and an uplink power control configuration of the second uplink carrier.

Optionally, the resource configuration information includes a dedicated random access resource (dedicated RACH resource). The dedicated random access resource may be used by the terminal device to initiate contention-free random access (contention-free RA/CFRA). Specifically, the dedicated random access resource includes a preamble index and a time-frequency resource.

Specifically, when the resource configuration information includes the dedicated random access resource, the target network device may configure one dedicated random access resource for one common UL carrier and/or at least one SUL carrier. Alternatively, the target network device may configure the dedicated random access resource for both the common UL carrier and/or the at least one SUL carrier.

In a specific implementation, the indication information may include a carrier index corresponding to the dedicated random access resource. Specifically, the carrier index may explicitly indicate a correspondence between the random access resource and an uplink carrier, that is, explicitly indicating an index number of the uplink carrier corresponding to the dedicated random access resource. In this way, the terminal device can determine, based on the carrier index corresponding to the dedicated random access resource, the uplink carrier corresponding to the dedicated random access resource.

For example, in a scenario in which only one SUL carrier is considered, an index value of the SUL carrier is 1. Specifically, a system message, RRC signaling, or a protocol specifies (that is, writing down in a protocol) the index value of the carrier. The indication information may include a dedicated random access resource, and a configuration information element of the dedicated random access resource includes the carrier index value 1. In this case, the indication information is used to indicate that the uplink carrier corresponding to the dedicated random access resource is a SUL carrier #1.

For another example, the indication information may include a dedicated random access resource #1. Carrier indexes of the dedicated random access resource #1 are 0, 2, and 3, and the carrier indexes 0, 2, and 3 are respectively corresponding to the common UL carrier, the SUL carrier #1, and an SUL carrier #3. In this case, the indication information is used to indicate that uplink carriers corresponding to the dedicated random access resource #1 are the common UL carrier, the SUL carrier #1, and the SUL carrier #3, in other words, the target network device allocates the same dedicated random access resource #1 to the common UL carrier, the SUL carrier #1, and the SUL carrier #3.

For another example, in a scenario in which a common UL carrier #1, a SUL carrier #2, and a SUL carrier #4 are considered, specifically, a system message, RRC signaling, or a protocol writes down index values of carriers, indication information includes a dedicated random access resource #1, a dedicated random access resource #2, and a dedicated random access resource #3, where a configuration information element of the dedicated random access resource #1 includes a carrier index value 1, in other words, the indication information is used to indicate that the uplink carrier corresponding to the dedicated random access resource #1 is the common UL carrier #1; a configuration information element of the dedicated random access resource #2 includes a carrier index value 2, in other words, the indication information is used to indicate that an uplink carrier corresponding to the dedicated random access resource #2 is the SUL carrier #2; and a configuration information element of the dedicated random access resource #3 includes a carrier index value 4, in other words, the indication information is used to indicate that an uplink carrier corresponding to the dedicated random access resource #3 is the SUL carrier #4.

In another specific implementation, the resource configuration information may further include a PUCCH resource. In this case, there may be a correspondence between the dedicated random access resource and an uplink carrier on which a physical uplink control channel PUCCH resource is configured, that is, the dedicated random access resource is corresponding to the uplink carrier on which the PUCCH resource is configured. In other words, the indication information may implicitly indicate uplink carriers corresponding to the dedicated random access resource.

For example, the indication information may include the dedicated random access resource #1, and the network device configures the PUCCH resource for the common UL carrier, the SUL carrier #1, and the SUL carrier #3. The network device implicitly indicates that uplink carriers corresponding to the dedicated random access resource #1 are the common UL carrier, the SUL carrier #1, and the SUL carrier #3, that is, the target network device allocates the dedicated random access resource #1 to the common UL carrier, the SUL carrier #1, and the SUL carrier #3.

In another specific implementation, an information element, for example, ra-PRACH-MaskIndex, may be used to indicate an uplink carrier corresponding to the dedicated random access resource. For example, a reserved index in the mask index is used for indication. Optionally, the ra-PRACH-MaskIndex may be included in the dedicated random access resource, and configuration information of the dedicated random access resource is included in the handover message.

Alternatively, a quantity of mask indexes in the ra-PRACH-MaskIndex may be extended, and an extended mask index is used to indicate an uplink carrier corresponding to the dedicated random access resource. Specifically, existing mask indexes are only 0 to 15, and mask indexes used for indication may be directly specified in the protocol.

Alternatively, a correspondence between a dedicated random access resource and an uplink carrier may be indicated by using the ra-PRACH-MaskIndex. For example, a mask index may be used to correspond to a carrier index.

In another specific implementation, it may be specified in the protocol that the dedicated random access resource may be corresponding to any uplink carrier by default.

In this way, the target network device may allocate the dedicated random access resource to the at least one uplink carrier in the foregoing several manners. Correspondingly, the terminal device may determine, based on the indication information, the at least one uplink carrier corresponding to the dedicated random access resource.

Optionally, the resource configuration information may include a common random access resource, and the common random access resource may be for use by the terminal device to initiate contention-based random access (contention-based RA, CBRA). Specifically, the handover message may include a random access channel (RACH) configuration, and the RACH configuration may include the common random access resource. In a possible manner, the common random access resource is corresponding to one common UL carrier and/or at least one SUL carrier. In another possible manner, there are a plurality of common random access resources that are respectively corresponding to one common UL carrier and/or at least one SUL carrier.

Specifically, when the resource configuration information includes the dedicated random access resource, the terminal device preferably initiates random access on the dedicated random access resource. When the resource configuration information does not include a dedicated random access resource, or the terminal device fails to initiate the contention-free random access in the dedicated random access resource, the terminal device may initiate random access on the common random access resource.

220. The terminal device determines, based on the resource configuration information of the at least one uplink carrier, one uplink carrier from the at least one uplink carrier as a target carrier for performing random access. That is, the target carrier herein is the first uplink carrier or the second uplink carrier described above. In other words, the target carrier is an uplink carrier in a target cell to which the terminal device is to be handed over, to be specific, the target carrier is the common UL carrier or the SUL carrier.

In a specific implementation, when the resource configuration information includes a dedicated random access resource, the terminal device may determine, based on the indication information, at least one uplink carrier corresponding to the dedicated random access resource.

In an example, the terminal device determines a carrier indicated by the carrier index corresponding to the dedicated random access resource, as the at least one uplink carrier corresponding to the dedicated random access resource.

In another example, the terminal device determines, based on a correspondence between the dedicated random access resource and an uplink carrier on which the PUCCH resource is configured, the uplink carrier on which the PUCCH resource is configured, as the at least one uplink carrier corresponding to the dedicated random access resource.

In another example, the terminal device may determine, based on a mask index indicator bit in the ra-PRACH-MaskIndex, the at least one uplink carrier corresponding to the dedicated random access resource.

In another example, the terminal device may consider by default that the dedicated random access resource may be corresponding to any uplink carrier.

In this embodiment of this application, when the at least one uplink carrier corresponding to the dedicated random access resource includes one uplink carrier, the terminal device determines the uplink carrier as the target carrier, and initiates random access in the target carrier. In other words, in this case, the target network device configures the dedicated random access resource only for one uplink carrier (to be specific, the common UL carrier or the SUL carrier); the terminal device initiates random access by using a dedicated random access resource corresponding to the uplink carrier.

When the at least one uplink carrier corresponding to the dedicated random access resource includes at least two (that is, a plurality of) uplink carriers, the terminal device determines one of the at least two uplink carriers as the target carrier, and initiates random access on the target carrier by using the dedicated random access resource. In other words, in this case, the target network device configures the dedicated random access resource for the plurality of uplink carriers (one common UL carrier and/or at least one SUL carrier).

In this case, the terminal device may determine the target carrier based on the PUCCH resource in the resource configuration information. Specifically, the terminal device may determine one of uplink carriers, on which the PUCCH resource is configured, of the at least two uplink carriers as the target carrier.

Specifically, in this case, if the target network device configures the PUCCH resource only for one of uplink carriers on which the dedicated random access resource is configured, the terminal device performs random access by using a dedicated random access resource corresponding to a carrier on which the dedicated random access resource and the PUCCH resource are configured. If the target network device configures the PUCCH resource for more of a plurality of uplink carriers on which the dedicated random access resource is configured, the terminal device may perform random access by using a dedicated random access resource corresponding to one of a plurality of uplink carriers on which the dedicated random access resource and the PUCCH resource are configured.

In another specific embodiment, when the resource configuration information includes a PUCCH resource, the terminal device determines one of uplink carriers, on which the PUCCH resource is configured, of the at least one uplink carrier as the target carrier. Specifically, in this case, a handover request response or the handover message does not include a dedicated random access resource, but the handover request response or the handover message includes a common random access resource. If the indication information includes a PUCCH resource of one uplink carrier, the terminal device performs, by using the common random access resource, contention-based random access on the uplink carrier on which the PUCCH resource is configured. If the handover request response or the handover message includes a PUCCH resource configured for a plurality of uplink carriers, the terminal device may perform, by using the common random access resource, contention-based random access on one of the plurality of uplink carriers on which the PUCCH resource is configured.

Optionally, in this embodiment of this application, when there are at least two uplink carriers on which the PUCCH resource is configured, the terminal device may randomly select an uplink carrier from the at least two uplink carriers on which the PUCCH resource is configured, as the target carrier for performing random access, or the terminal device may select the uplink carrier based on a sequence configured by the network device. For example, the terminal device may determine the first uplink carrier, on which the PUCCH resource is configured (or on which the dedicated random access resource and the PUCCH resource are configured), in the indication information as the target carrier for performing random access.

Optionally, in this embodiment of this application, when there are at least two uplink carriers on which the PUCCH resource is configured, the terminal device determines, based on a measurement result of the target cell, the target carrier from the at least two uplink carriers on which the PUCCH resource is configured.

Optionally, in this embodiment of this application, the resource configuration information includes a common random access resource, and that the terminal device determines, based on the resource configuration information of the at least one uplink carrier, one uplink carrier from the at least one uplink carrier as the target carrier for performing random access includes: determining, by the terminal device, the target carrier from the at least one uplink carrier based on the measurement result of the target cell.

In other words, when the resource configuration information does not include a dedicated random access resource or the PUCCH resource, that is, the resource configuration information includes only the common random access resource, or when the resource configuration information includes a dedicated random access resource, but the network device does not indicate, by using the foregoing explicit or implicit method, an uplink carrier corresponding to the dedicated random access resource, the indication information sent by the network device may indicate the common random access resource of the at least one uplink carrier. The terminal device may determine the target carrier from the at least one uplink carrier based on the measurement result of the target cell.

The measurement result of the cell herein is a cell-level measurement result of the cell and/or a signal measurement result of the cell. The signal measurement result includes a measurement result of a downlink reference signal. The downlink reference signal may include an SS (including a primary synchronization signal PSS/a secondary synchronization signal SSS) and/or a CSI-RS and/or a PBCH-DMRS. In a manner, an existing cell measurement method is used during measurement, for example, a cell measurement technology in an LTE system: The terminal device obtains a cell-level measurement result of a serving cell and/or a neighboring cell through measurement based on a measurement configuration. In another possible manner, because a beam concept is introduced in a 5G new radio technology, the cell-level measurement result may be a measurement result obtained by averaging measurement results of one or more beams in a cell. Specifically, the measurement result of the downlink reference signal includes reference signal received power (RSRP) and reference signal received quality (RSRQ).

Optionally, in this embodiment of this application, the reconfiguration message used for synchronization further includes the threshold, and the threshold is used by the terminal device to determine the target carrier based on the measurement result of the downlink reference signal.

In this embodiment of this application, the threshold may be configured in any one of the following three manners. It may be understood that the following three manners are merely used as examples for description, and do not constitute any limitation on this embodiment of this application.

(1) A system message of the target network device may include the threshold. The system message is, for example RMSI. Currently, in a standard, a threshold used for uplink carrier selection during initial access is included in a system message. The threshold in this application may be the same as a threshold used during initial access, in other words, the threshold included in the system message is unique, and may be applicable to both uplink carrier selection performed during initial access and uplink carrier selection performed during a handover. Alternatively, the threshold may be different from a threshold used during initial access, that is, the system message includes two thresholds: one is used for uplink carrier selection during initial access, and the other one is used for uplink carrier selection during a handover.

It may be understood that in this case, the handover message in this embodiment of this application does not include the threshold. In this case, the terminal device may select the uplink carrier based on the threshold included in the system message broadcast by the target network device.

(2) The handover message sent by the source network device to the terminal device may include the threshold. Specifically, the threshold may be included in the RMSI, and the RMSI is optionally included in the handover message. Specifically, a manner in which the RMSI includes the threshold may be described as manner (1). In this case, the terminal device may select the uplink carrier based on the threshold included in the handover message.

(3) A value of the threshold may be preconfigured for the terminal device.

In this embodiment of this application, if the measurement result of the downlink reference signal is greater than or equal to the threshold, the terminal device determines the first uplink carrier as the target carrier; or if the measurement result of the downlink reference signal is less than the threshold, the terminal device determines the second uplink carrier as the target carrier. The first uplink carrier herein is the common UL carrier described above, and the second uplink carrier is the SUL carrier described above.

Optionally, the terminal device may select the uplink carrier by using the either of following two methods. It may be understood that the following two manners are merely used as examples for description, and do not constitute any limitation on this embodiment of this application.

(1) There are two uplink carriers (and the two uplink carriers are a first uplink carrier and a second uplink carrier).

In this case, if the RSRP or the RSRQ is greater than or equal to the threshold, the terminal device performs random access on the first uplink carrier; or if the RSRP or the RSRQ is less than the threshold, the terminal device performs random access on the second uplink carrier.

(2) There are more than two uplink carriers (and the at least two uplink carriers are a first uplink carrier and at least two second uplink carriers):

In this case, if a threshold is preconfigured, or the system message or the handover message includes a threshold, when the RSRP or the RSRQ is greater than or equal to the threshold, the terminal device performs random access on the first uplink carrier; or when the RSRP or the RSRQ is less than the threshold, the terminal device performs random access on any one of the at least two second uplink carriers.

If two thresholds are specified in the protocol, or the system message includes two thresholds, the terminal device may determine, based on the two thresholds and the measurement result, one of the plurality of uplink carriers to perform random access. Specifically, the network device may indicate a correspondence between the two thresholds and uplink carrier selection (which may alternatively be specified in the protocol or indicated in the system message or the handover message). For example, the two thresholds may be a first threshold (threshold 1) and a second threshold (threshold 2), and the more than two uplink carriers may include a common UL1, an SUL1, and an SUL2. When the RSRP or the RSRQ is less than the threshold 1, the terminal device selects the SUL1 to perform random access; when the RSRP or the RSRQ is greater than the threshold 1 and less than the threshold 2, the terminal device selects the SUL2 to perform random access; or when the RSRP or the RSRQ is greater than the threshold 2, the terminal device selects the common UL1 to perform random access.

If the terminal device fails to perform contention-free random access on the target carrier by using the dedicated random access resource, the terminal device may perform contention-based random access on the target carrier or another uplink carrier different from the target carrier by using the common random access resource. Specifically, the another uplink carrier may be another uplink carrier different from the target carrier, and optionally, the PUCCH resource may be configured for the another uplink carrier.

When the resource configuration information does not include a dedicated random access resource, but includes a common random access resource, the terminal device may initiate, by using the common random access resource, contention-based random access (CBRA) on the target carrier.

Optionally, in this embodiment of this application, the handover message may further include second indication information. The second indication information is used to indicate that after the terminal device initiates random access on the target carrier in a power ramping manner for X times (in other words, after the terminal device performs power ramping on the target carrier for X−1 times), or after the terminal device fails to initiate random access on the target carrier for Y times, or after the terminal device sends a random access preamble sequence on the target carrier for Z times, the terminal device performs random access on another uplink carrier different from the target carrier, where X, Y, and Z are all positive integers greater than 1.

It may be understood that when the terminal device initiates random access on the target carrier in the power ramping manner, the terminal device may perform, for a first time, random access by using relatively low transmit power. When the first random access fails, the terminal device may increase the transmit power by a first step, and then perform, for a second time, random access on the target carrier by using increased transmit power. After the terminal device increases the transmit power by X−1 times (in other words, random access is performed for X times) in the foregoing manner, the terminal device may perform random access on the another uplink carrier different from the target carrier.

In addition, when the terminal device fails to initiate random access on the target carrier for Y times, Y may be a maximum quantity of random access initiation failures specified in the protocol. Alternatively, Y may be a quantity of times indicated by the second indication information, and the quantity of times may be less than or equal to the maximum quantity of random access initiation failures specified in the protocol. In addition, a case in which random access fails after power ramping is performed for a plurality of times in a random access process may be considered as a random access failure process. This is not limited in this embodiment of this application.

Correspondingly, after the terminal device initiates random access on the target carrier in the power ramping manner for X times, or after the terminal device fails to initiate random access on the target carrier for Y times, or the terminal device sends the random access preamble sequence on the target carrier for Z times, the terminal device performs random access on the another uplink carrier different from the target carrier.

It should be noted that in this embodiment of this application, before the terminal device performs random access on the another uplink carrier different from the target carrier, the terminal device may have failed to perform random access on the dedicated random access resource or the common random access resource.

Therefore, in this embodiment of this application, when the target cell to which the terminal device is to be handed over includes the first uplink carrier and the at least one second uplink carrier, and the first uplink carrier and the at least one second uplink carrier are corresponding to one downlink carrier in the target cell, the network device may send the resource configuration information of the at least one uplink carrier including the first uplink carrier and/or the second uplink carrier to the terminal device, so that the terminal device can determine, based on the resource configuration information of the at least one uplink carrier, one of the at least one uplink carrier as the target carrier for performing random access.

It should be understood that the network device herein may be the target network device or the source network device. Specifically, the target network device may send a handover request response that includes the resource configuration information to a source network device. After receiving the handover request response, the source network device sends a handover message to the terminal device, where the handover message includes the resource configuration information.

Figure 3:
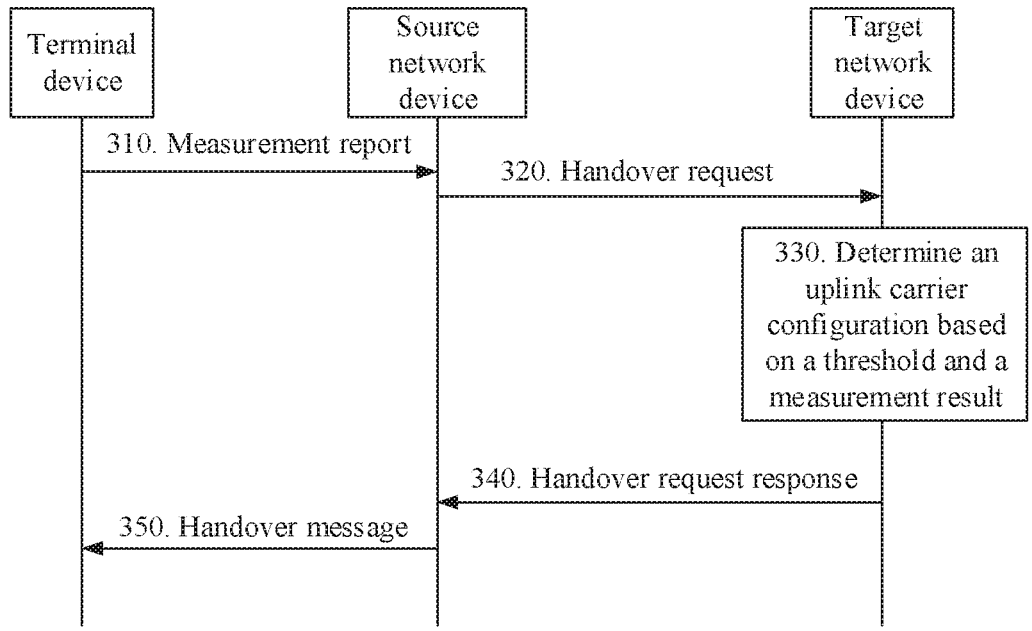
FIG. 3 is a schematic flowchart of another communication method according to an embodiment of this application.

FIG. 3 is a schematic interaction flowchart of another communication method according to an embodiment of this application. It should be understood that FIG. 3 shows steps or operations of the communication method. However, these steps or operations are merely examples. Other operations or variants of the operations in FIG. 3 may alternatively be performed in this embodiment of this application. In addition, the steps in FIG. 3 may be performed in a sequence different from that shown in FIG. 3, and possibly, not all the operations in FIG. 3 need to be performed.

310. A terminal device sends a measurement report to a source network device (for example, a source gNB).

Specifically, the terminal device measures a serving cell and/or a neighboring cell, and sends the measurement report to the source network device. The measurement report includes a measurement result of the serving cell and/or the neighboring cell. Specifically, for the measurement result of the cell, refer to description in FIG. 2. To avoid repetition, details are not described again.

After performing handover determining based on the measurement report reported by the terminal device or based on other information, and determining a target cell, the source network device sends a handover request message to a network device to which the target cell belongs, namely, a target network device.

320. The source network device sends a handover request to the target network device, where the handover request includes a measurement result reported by the terminal device in the measurement report, the measurement result includes a measurement result of a target cell, and optionally, includes a signal measurement result of the target cell.

Specifically, the measurement result may be included in an RRC container of the handover request message, or the measurement result may be an interface information element of an Xn interface, and the information element is included in the handover request message.

330. The target network device determines an uplink carrier configuration based on a threshold and the measurement result.

Specifically, the uplink carrier configuration includes resource configuration information of at least one uplink carrier. The at least one uplink carrier herein includes a first uplink carrier and/or at least one second uplink carrier (to be specific, a common UL carrier and at least one SUL carrier). Specifically, for descriptions of the first uplink carrier and the second uplink carrier, refer to the foregoing descriptions. To avoid repetition, details are not described again.

In this embodiment of this application, the uplink carrier configuration includes resource configuration information of an uplink carrier, and the resource configuration information may include a dedicated random access resource and/or a PUCCH resource.

Specifically, when the target network device supports at least two uplink carriers, the target network device may configure a dedicated random access resource for one of the uplink carriers. In a specific implementation, when a measurement result, RSRP or RSRQ, of the target cell is greater than or equal to a threshold, the target network device configures the dedicated random access resource for the first uplink carrier. When the measurement result, RSRP or RSRQ, of the target cell is less than a threshold, the target network device configures the dedicated random access resource for one of the at least one second uplink carrier. Optionally, in this case, the network device may further configure a PUCCH resource for the uplink carrier.

Alternatively, when the target network device supports at least two uplink carriers, the target network device may configure no dedicated random access resources but the PUCCH resource for one of the uplink carriers. In a specific implementation, when the measurement result, RSRP or RSRQ, of the target cell is greater than or equal to a threshold, the target network device configures the PUCCH resource for the first uplink carrier. When the measurement result, RSRP or RSRQ, of the target cell is less than a threshold, the target network device configures the PUCCH resource for one of the at least one second uplink carrier.

Optionally, there may be the following six possible cases in which the target network device configures a random access resource for the terminal device.

(1) The target network device supports two uplink carriers (one common UL carrier and one SUL carrier), and configures a dedicated random access resource for each of the two uplink carriers.

(2) The target network device supports two uplink carriers (one common UL carrier and one SUL carrier), and the target network device configures no dedicated random access resources but a PUCCH configuration for each of uplink carriers.

(3) The target network device supports more than two uplink carriers (one common UL carrier and at least one SUL carrier), and the target network device configures a dedicated random access resource for each of the uplink carriers.

(4) The target network device supports more than two uplink carriers (one common UL carrier and at least one SUL carrier), and a second network device configures a dedicated random access resource for one or some (some of the at least two uplink carriers) of the uplink carriers.

(5) The target network device supports more than two uplink carriers (one common UL carrier and at least one SUL carrier), and a second network device configures no dedicated random access resources but a PUCCH configuration for each of the uplink carriers.

(6) The target network device supports more than two uplink carriers, and the target network device configures no dedicated random access resources but a PUCCH configuration for one or some of the uplink carriers.

Optionally, in this embodiment of this application, a handover message may further include second indication information. The second indication information is used to indicate that after the terminal device initiates random access on the target carrier in a power ramping manner for X times (in other words, after the terminal device performs power ramping on the target carrier for X−1 times), or after the terminal device fails to initiate random access on the target carrier for Y times, or after the terminal device sends a random access preamble sequence on the target carrier for Z times, the terminal device performs random access on another uplink carrier different from the target carrier, where X. Y, and Z are all positive integers greater than 1.

340. The target network device sends a handover request response to the source network device, where the handover request response includes resource configuration information of an uplink carrier determined by the target network device.

350. The source network device sends the handover message to the terminal device, where the handover message includes the resource configuration information of the uplink carrier determined by the target network device.

Specifically, for the resource configuration information in 340 and 350, refer to description in 330. To avoid repetition, details are not described again.

After receiving the resource configuration information, sent by the source network device, of the at least one uplink carrier, an action of the terminal device may vary with a different resource configuration case.

In an example, if the resource configuration information of the at least one uplink carrier includes a dedicated random access resource of an uplink carrier, the terminal device may preferably perform random access by using the dedicated random access resource corresponding to the carrier. If the random access fails, the terminal device continues to perform random access on the carrier by using a common random access resource. In addition, if the terminal device fails to perform contention-based random access on the carrier by using the common random access resource, the terminal device may perform contention-based random access on another uplink carrier different from the carrier by using the common random access resource.

In another example, if the resource configuration information of the at least one uplink carrier does not include any dedicated random access resource but a PUCCH configuration of one of the uplink carriers, a terminal device can perform, by using a common random access resource, contention-based random access only on the uplink carrier on which the PUCCH configuration is configured. If the contention-based random access fails, the terminal device may initiate an RRC connection re-establishment procedure or perform random access by using a common random access resource of another uplink carrier.

In another example, for case (1) of the foregoing six cases, if the target network device configures the dedicated random access resource for each of the uplink carriers, the terminal device may use any one of the following four manners:

(1) performing selection based on a sequence configured by the target network device;

(2) performing random selection;

(3) preferably using a dedicated random access resource that first arrives, and selecting an uplink carrier corresponding to the dedicated random access resource, and (4) if the target network device provides another threshold (different from the threshold used by the network side to perform determining, for example, the handover request response message and the handover message include the another threshold), performing, by the terminal device, determining again based on the threshold and the measurement result of the target cell, where specifically, when the measurement result, RSRP or RSRQ, of the downlink signal of the target cell is greater than or equal to the threshold, random access is performed by using a dedicated random access resource corresponding to the first uplink carrier (the common UL carrier), or if the measurement result, RSRP or RSRQ, of the downlink signal of the target cell is less than the threshold, random access is performed by using a dedicated random access resource corresponding to the second uplink carrier (the SUL carrier); or when the handover request response message/handover message does not include the threshold, the terminal device performs determining again based on the threshold in the RMSI and the measurement result of the target cell.

In another example, for case (2) of the foregoing six cases, if the target network device supports two uplink carriers (an NR UL carrier and the SUL carrier), and the target network device configures no dedicated random access resources, but configures a PUCCH configuration for both uplink carriers, the terminal device may use any one of the following four manners:

(1) performing selection based on a sequence configured by the target network device;

(2) performing random selection;

(3) preferably using a common random access resource that first arrives, and selecting an uplink carrier corresponding to the common random access resource; and (4) if the target network device provides another threshold (different from the threshold used by the network side to perform determining, for example, the handover request response message and the handover message include the another threshold), performing, by the terminal device, determining again based on the threshold and the measurement result of the target cell, where specifically, when the measurement result, RSRP or RSRQ, of the downlink signal of the target cell is greater than or equal to the threshold, random access is performed by using a common random access resource corresponding to the first uplink carrier (the common UL carrier), or if the measurement result, RSRP or RSRQ, of the downlink signal of the target cell is less than the threshold, random access is performed by using a common random access resource corresponding to the second uplink carrier (the SUL carrier); or when the handover request response message/handover message does not include the threshold, the terminal device performs determining again based on the threshold in the RMSI and the measurement result of the target cell.

In another example, for case (3) of the foregoing six cases, if the target network device supports more than two uplink carriers (one NR UL carrier and at least one SUL carrier), and the target network device configures dedicated random access resources for all uplink carriers, the terminal device may use any one of the following four manners:

(1) performing selection based on a sequence configured by the target network device;

(2) performing random selection;

(3) preferably using a dedicated random access resource that first arrives, and selecting an uplink carrier corresponding to the resource; and (4) a manner: if the target network device provides another threshold (different from the threshold used by the network side to perform determining, for example, the handover request response message and the handover message include the another threshold), the threshold may include one or more thresholds.

In this case, if one threshold is specified in a protocol, or the system message or the handover message includes a threshold, when the measurement result, RSRP or RSRQ, of the downlink signal of the target cell is greater than or equal to the threshold, random access is initiated by using a random access resource corresponding to the first uplink carrier; or when the measurement result, RSRP or RSRQ, of the downlink signal of the target cell is less than the threshold, random access is initiated by using any random access resource in remaining uplink carriers.

If a plurality of thresholds are specified in a protocol, or the system message or the handover message includes a plurality of thresholds, the network device may indicate a correspondence between the two thresholds and uplink carrier selection (which may alternatively be specified in the protocol, or may be indicated in the system message or the handover message). For example, all the uplink carriers supported by the network device include a common UL1, an SUL1, and an SUL2, and the plurality of thresholds are a threshold 1 and a threshold 2. When the RSRP or the RSRQ is less than the threshold 1, the terminal device selects the SUL1 to perform random access. When the RSRP or the RSRQ is greater than the threshold 1 and less than the threshold 2, the terminal device selects the SUL2 to perform random access. When the RSRP or the RSRQ is greater than the threshold 2, the terminal device selects the common UL1 to perform random access.

In another example, for case (4) of the foregoing six cases, because the target network device supports more than two uplink carriers, and the target network device configures the dedicated random access resource for one or more uplink carriers, the terminal device performs random access preferably by using the dedicated random access resource. If there are a plurality of dedicated random access resources corresponding to a plurality of uplink carriers, the terminal device may use any one of the following three manners:

(1) performing selection based on a sequence configured by the target network device.

(2) performing random selection.

(3) preferably using a dedicated random access resource that first arrives, and selecting an uplink carrier corresponding to the resource to perform random access.

In this case, if random access performed by using the dedicated random access resource fails, random access continues to be performed on the carrier by using the common random access resource.

In this case, the terminal device may perform random access based on the second indication information sent by the network device. To be specific, after initiating, on the common random access resource, random access in a power ramping manner for X times (increasing transmit power of a random access message 1 in a step-by-step manner), the terminal device performs random access by using another uplink carrier. Alternatively, after failing to initiate random access on the common random access resource for Y times, the terminal device performs random access by using another uplink carrier.

In another example, for case (5) of the foregoing six cases, when the terminal device initiates, by using the common random access resource, random access on an uplink carrier on which a PUCCH resource is configured, the terminal device may use any one of the following three manners:

(1) performing selection based on a sequence configured by the target network device.

(2) performing random selection.

(3) preferably using a PUCCH resource that first arrives, and selecting an uplink carrier corresponding to the resource to perform random access.

In another example, for case (6) of the foregoing six cases, if the target network device supports more than two uplink carriers, and the target network device configures no dedicated random access resources but a PUCCH resource for one or some of uplink carriers, the terminal device may use any one of the following three manners:

(1) randomly selecting an uplink carrier.

(2) performing selection based on a sequence of uplink carriers configured by the target network device.

(3) performing determining based on a threshold preconfigured by the target network, to determine an uplink carrier on which random access is to be performed.

Therefore, in this embodiment of this application, when the target cell to which the terminal device is to be handed over includes the first uplink carrier and the at least one second uplink carrier, and the first uplink carrier and the at least one second uplink carrier are corresponding to one downlink carrier in the target cell, the target network device may determine the resource configuration information of the at least one uplink carrier based on the measurement result and the threshold that are sent by the terminal device, and send the resource configuration information to the terminal device, so that the terminal device can determine, based on the resource configuration information of the at least one uplink carrier, one of the at least one uplink carrier as the target carrier for performing random access.

Figure 4:
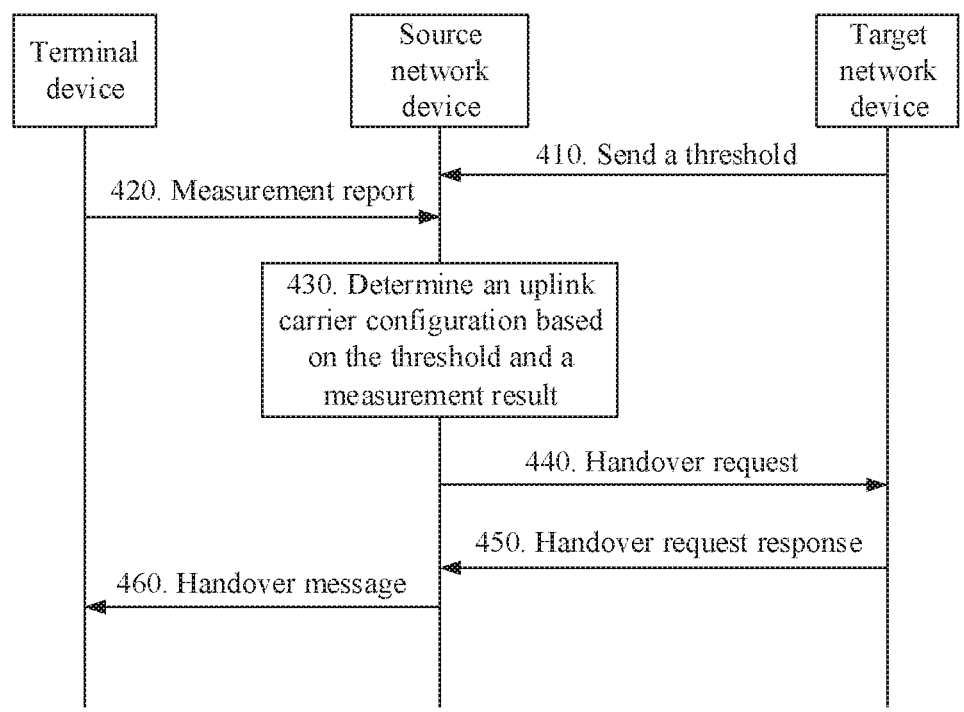
FIG. 4 is a schematic flowchart of another communication method according to an embodiment of this application.

FIG. 4 is a schematic interaction flowchart of another communication method according to an embodiment of this application. It should be understood that FIG. 4 shows steps or operations of the communication method. However, these steps or operations are merely examples. Other operations or variants of the operations in FIG. 4 may alternatively be performed in this embodiment of this application. In addition, the steps in FIG. 4 may be performed in a sequence different from that shown in FIG. 4, and possibly, not all operations in FIG. 4 need to be performed.

410. A target network device (for example, a target gNB) sends a threshold to a source network device (for example, a source gNB), where the threshold is used to select an uplink carrier. Specifically, for the threshold herein, refer to the foregoing description of the threshold. To avoid repetition, details are not described again.

420. A terminal device sends a measurement report to the source network device. Specifically, for the measurement report, refer to the foregoing description. To avoid repetition, details are not described again.

Herein, a logical sequence of step 410 and a logical sequence of step 420 are interchangeable. To be specific, the target network device may send the threshold to the source network device before or after the terminal device sends the measurement report to the source network device.

430. The source network device determines a target carrier from at least one uplink carrier based on the threshold and the measurement result reported by the terminal device.

The at least one uplink carrier herein belongs to a target cell (that is, a cell to which the terminal device is to be handed over) of the target network device. Specifically, the at least one uplink carrier includes a first uplink carrier and at least one second uplink carrier, and the target carrier is the first uplink carrier or a second uplink carrier. Specifically, for at least one second uplink carrier and the target carrier, refer to the foregoing description. To avoid repetition, details are not described again.

440. The source network device sends a handover request to the target network device, where the handover request includes information about the target carrier determined in 430, to be specific, the handover request may include the information used to indicate that the target network device performs resource configuration for the first uplink carrier or the second uplink carrier.

450. The target network device performs resource configuration for the first uplink carrier or the second uplink carrier based on the information that is included in the handover request message and that is used to indicate that the target network device performs resource configuration for the first uplink carrier or the second uplink carrier, and sends a handover request response to the source network device, where the handover request response includes resource configuration information of the determined target carrier.

Specifically, for the handover request response, refer to the foregoing description of the handover request response. To avoid repetition, details are not described again.

460. The source network device sends a handover message to the terminal device.

Specifically, for the handover message, refer to description of the handover request response in step 450. To avoid repetition, details are not described again.

In addition, after receiving the handover message sent by the source network device, an action of the terminal device may vary with a specific case of resource configuration information in the handover message. Specifically, for a specific action of the terminal device, refer to the foregoing description. To avoid repetition, details are not described again.

Therefore, in this embodiment of this application, when the target cell to which the terminal device is to be handed over includes the first uplink carrier and the at least one second uplink carrier, and the first uplink carrier and the at least one second uplink carrier are corresponding to one downlink carrier in the target cell, the source network device may determine, based on the measurement result sent by the terminal device and the threshold sent by the target network device, the at least one uplink carrier on which resource configuration needs to be performed by the target network device, and instruct the target network device to perform resource configuration for the determined at least one uplink carrier. Then the target network device performs resource configuration for the determined at least one uplink carrier based on indication information included in the handover request message, adds resource configuration information of the determined at least one uplink carrier to the handover request response message, and sends the handover request response message to the source network device. The source network device sends the resource configuration information to the terminal device, so that the terminal device determines, based on the resource configuration information of the at least one uplink carrier, one uplink carrier from the at least one uplink carrier as the target carrier for performing random access.

In this embodiment of this application, the handover message may include information elements related to a bandwidth part (BWP) and information elements related to an SUL carrier.

Specifically, for downlink transmission, the handover message may include downlink (DL) configuration information, and the DL configuration information includes DL common configuration information and downlink BWP configuration information. The downlink BWP configuration information includes at least one type of the following information: a frequency, bandwidth, and a frequency offset. Further, the downlink BWP configuration information may further include a physical information configuration, for example, at least one of a PDCCH configuration and a PDSCH configuration.

For uplink transmission, the handover message may include uplink UL configuration information. Specifically, an example in which the uplink carrier includes one common UL carrier and one SUL carrier is used for description.

In a possible implementation, a system message and a dedicated RRC message may include an index value of the common UL carrier and an index value of the SUL carrier, or an index value of the common UL carrier and an index value of the SUL carrier that are directly specified in a protocol. For example, the common UL carrier is corresponding to an index 0, and the SUL carrier is corresponding to an index 1. In this case, the handover message may include a dedicated random access channel RACH configuration. The dedicated RACH configuration may be used to indicate a relationship between a dedicated random access resource and an uplink carrier. For example, an information element of the dedicated RACH configuration includes a carrier index. For example, the dedicated random access resource is corresponding to the common UL carrier, and the dedicated RACH configuration includes the carrier index value index 0.

In addition, in this embodiment of this application, the SUL carrier and the common UL carrier may support one or more BWPs (specifically, the dedicated RRC message or the system message may be used to configure a BWP index value).

In an example, when the common UL carrier supports one or more BWPs, a BWP of the carrier that is corresponding to the dedicated random access resource corresponding to the common UL carrier needs to be indicated. For example, the dedicated random access resource is corresponding to a BWP1 of an NR UL carrier, and in addition to the carrier index value index 0, the dedicated RACH configuration further needs to include the BWP index value BWP1. In this way, after receiving the handover message, the terminal device can perform random access by using a dedicated random access resource in a frequency band of the BWP1 corresponding to the common UL carrier.

It may be understood that the foregoing provides description by using the common UL carrier as an example, and the configuration method in this embodiment of this application may also be applicable to the SUL carrier.

In addition, optionally, in addition to the dedicated RACH configuration, the handover message may further include common configuration information of the common UL carrier and common configuration information of the SUL carrier, and dedicated configuration information of the common UL carrier and dedicated configuration information of the SUL carrier. Specifically, the common configuration information may include at least one of a PUSCH configuration, a PUCCH configuration, an SRS configuration, an uplink power control configuration, and the like. The dedicated configuration information may include at least one of a PUSCH configuration, a PUCCH configuration, an SRS configuration, an uplink power control configuration, and the like.

In another possible implementation, the handover message may include uplink UL configuration information, where the UL configuration information includes the common configuration information of the common UL carrier and the common configuration information of the SUL carrier, and the dedicated configuration information of the common UL carrier and the dedicated configuration information of the SUL carrier.

The SUL carrier and the common UL carrier herein may support one or more BWPs each. In this case, the dedicated configuration information may further include a BWP configuration. Specifically, an index value of the BWP may be configured by using the dedicated RRC message or the system message. Optionally, the uplink BWP configuration may include at least one of the following: a frequency, bandwidth, a frequency offset, a PCSCH configuration, a PUCCH configuration, an SRS configuration, and an uplink power control configuration.

In an example, the common UL carrier supports a BWP1 and a BWP2, and the SUL carrier supports a BWP1' and a BWP2'. In this case, optionally, the dedicated RACH configuration may be included in the BWP configuration. For example, the dedicated RACH configuration may be included in the BWP1 configuration of the NR UL carrier; the terminal device performs random access by using a dedicated random access resource in a frequency band of the BWP1 corresponding to the common UL carrier. Optionally, if the common UL carrier does not support the BWP, the dedicated RACH configuration may be included in the dedicated configuration information of the common UL. For example, the dedicated RACH configuration may be included in the dedicated configuration of the common UL carrier; the terminal device performs random access by using the dedicated random access resource corresponding to the common UL carrier.

It may be understood that the foregoing uses the NR UL carrier as an example, and the foregoing configuration method is also applicable to the SUL carrier.

Optionally, in this embodiment of this application, the uplink configuration information may further include a semi-persistent scheduling (SPS) configuration and/or a grant-free (GF) configuration. Specifically, if GF/SPS resources are respectively configured for a same terminal device on the common UL carrier and the SUL carrier, it needs to be ensured that the GF/SPS resources configured on the common UL carrier and the SUL carrier are staggered in time domain. If a GF/SPS resource is configured only on one UL carrier, and no GF/SPS resource are configured on the other UL carrier, for example, the GF/SPS resource is configured on the SUL carrier but not on the common UL carrier, a slot corresponding to the GF/SPS resource configured on the SUL carrier needs to be bypassed when the terminal device is scheduled on the common UL carrier.

Similarly, when a secondary station is added in a dual connectivity (DC) scenario, the secondary station herein supports configuration of the SUL carrier. For example, if the SUL carrier is configured for a primary secondary cell PSCell (or a secondary cell SCell) of the secondary station, the terminal device may be configured by using an RRC reconfiguration message. Similarly, a specific configuration manner of the RRC reconfiguration message is the same as the foregoing configuration manner of the handover message.

With reference to FIG. 2 to FIG. 4, the foregoing describes in detail how to select an uplink carrier in a handover scenario to perform random access. It should be noted that the method in this embodiment of this application is also applicable to a dual connectivity scenario. Specifically, the source network device in the handover scenario may be corresponding to a master base station in the dual connectivity scenario, and the target network device in the handover scenario may be corresponding to a secondary base station in the dual connectivity scenario. It should be understood that the two corresponding devices herein may perform a same operation or similar operations. In addition, both the handover message in the handover scenario and the RRC connection reconfiguration message in the dual connectivity scenario may include the foregoing types of indication information.

Figure 5:
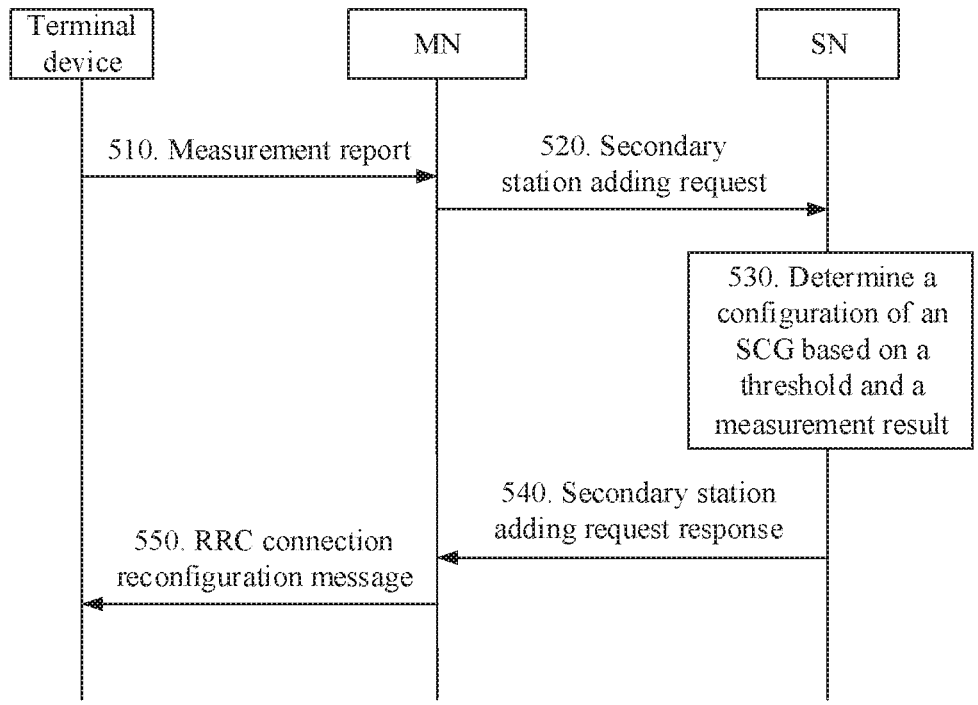
FIG. 5 is a schematic flowchart of another communication method according to an embodiment of this application.
Figure 6:
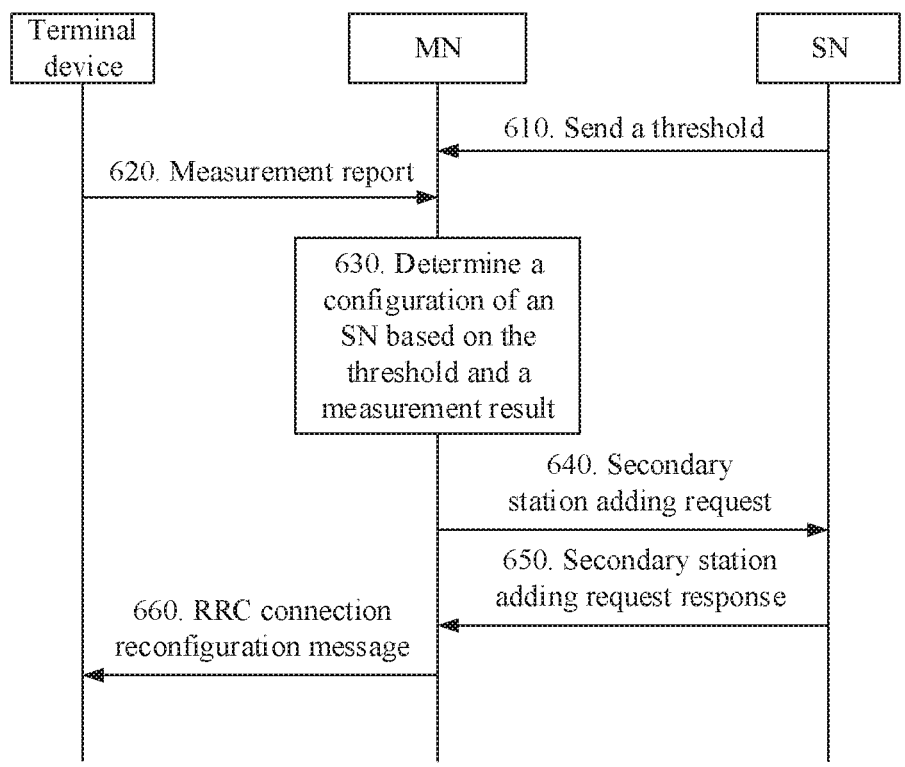
FIG. 6 is a schematic flowchart of another communication method according to an embodiment of this application.

With reference to FIG. 5 and FIG. 6, the following describes in detail a method for configuring an uplink carrier of a secondary station when a secondary station is added in the dual connectivity DC scenario.

FIG. 5 is a schematic flowchart of a method for adding a secondary station according to an embodiment of this application. It should be understood that FIG. 5 shows steps or operations of adding a secondary station. However, these steps or operations are merely examples. Other operations or variants of the operations in FIG. 5 may alternatively be performed in this embodiment of this application. In addition, the steps in FIG. 5 may be performed in a sequence different from that shown in FIG. 5, and possibly, not all operations in FIG. 5 need to be performed.

510. A terminal device sends a measurement report to a master node (MN).

The MN may be a master base station MgNB in an NR standard or a master base station MeNB in an LTE-standard.

Specifically, the measurement report includes a measurement result of a serving cell and/or a neighboring cell from the terminal device. Specifically, for the measurement result, refer to the foregoing description of the measurement result. To avoid repetition, details are not described again.

520. The MN sends a secondary station adding request message to a secondary node (SN).

The SN may be a secondary base station SgNB in an NR standard.

Specifically, after receiving the measurement report sent by the terminal device, the MN sends the secondary station adding request message to the SN, where the secondary station adding request message includes the measurement result reported by the terminal device in step 510, and the measurement result includes cell-level RSRP and/or RSRQ of a cell of the SN, or includes a signal measurement result, RSRP and/or RSRQ, of the cell.

530. The SN determines a configuration of a secondary cell group (SCG) based on a measurement result and a threshold that is used for uplink carrier selection.

Specifically, if the measurement result is lower than the threshold, the SCG may be configured based on either of the following two manners.

(1) The SN configures a radio resource only for an SUL carrier.

For example, the SN configures a dedicated RACH configuration only for the SUL carrier. The dedicated RACH configuration includes a preamble index and a time-frequency resource, and may further include at least one of a PUCCH configuration, a PUSCH configuration, and an uplink power control configuration.

(2) The SN respectively configures radio resources for an SUL carrier and a common UL carrier.

If the measurement result is higher than the threshold, the SCG may be configured in either of the following two manners.

(1) The SN configures a radio resource only for a common UL carrier. The dedicated RACH configuration includes a preamble index and a time-frequency resource, and may further include at least one of a PUCCH configuration, a PUSCH configuration, and an uplink power control configuration.

(2) The SN respectively configures radio resources for an SUL carrier and a common UL carrier.

540. The SN sends a secondary station adding request response to the MN, where the request response includes a related configuration of a corresponding uplink carrier.

550. The MN sends an RRC connection reconfiguration message to the terminal device, where the request response includes a related configuration of a corresponding uplink carrier.

Specifically, for configuration manner (1) in which the measurement result is lower than the threshold, the radio resource configuration corresponding to the SUL carrier is added to a secondary station adding request acknowledgment message. After receiving the secondary station adding request acknowledgment message, the MN adds the radio resource configuration corresponding to the SUL carrier to a first RRC connection reconfiguration message. After receiving the first reconfiguration message, the terminal device establishes an RRC connection to the SN by using the radio resource configuration corresponding to the SUL carrier (for example, performing random access to the primary secondary cell PSCell of the secondary station by using a dedicated RACH configuration corresponding to the SUL carrier and transmitting data to or receiving data from the secondary station by using a configuration such as a PUCCH/PUSCH configuration of the SUL carrier); and establishes a DC mode with the MN and the SN.

If a network side changes a configuration policy, the MN/SN sends a second reconfiguration message to the terminal device (for example, the second reconfiguration message includes an updated radio resource configuration corresponding to the SUL carrier (for example, when there is more than one SUL carrier, an SUL is changed; or when there is only one SUL carrier, a new radio resource configuration is configured for the SUL carrier), or includes the radio resource configuration corresponding to the common UL carrier (for example, when a downlink measurement result becomes better (higher than the threshold), the network side determines to enable the terminal device to communicate with the SN by using the radio resource configuration corresponding to the UL carrier)). After receiving the second reconfiguration message, the terminal device communicates with the SN by using the new configuration.

For configuration manner (2) in which the measurement result is lower than the threshold, the SN adds the radio resource configurations corresponding to the common UL carrier and the corresponding SUL carrier to the secondary station adding request acknowledgment message, and the SN instructs the terminal device to establish an RRC connection to the SN by using the radio resource configuration corresponding to the SUL carrier. After receiving the secondary station adding request acknowledgment message, the MN adds the radio resource configurations corresponding to the common UL carrier and the SUL carrier to the first RRC connection reconfiguration message. In addition, optionally, the first RRC connection reconfiguration message may include instruction information used to instruct the terminal device to establish a connection to the SN by using the radio resource configuration corresponding to the SUL carrier.

Optionally, the secondary station adding request acknowledgment message/RRC connection reconfiguration message includes a threshold used for uplink carrier selection. After receiving the RRC connection reconfiguration message, if finding that a downlink measurement result, RSRP, of a cell (a PSCell and/or an SCell) of the secondary station is higher than the threshold, the terminal device may change to communicate with the SN by using the radio resource configuration corresponding to the common UL carrier. Alternatively, the MN/SN sends the second reconfiguration message (for example, the second reconfiguration message carries an updated radio resource configuration corresponding to the SUL carrier (for example, when there is more than one SUL carrier, an SUL is changed; or when there is only one SUL carrier, a new radio resource configuration is configured for the SUL carrier) and/or the radio resource configuration of the common UL carrier, and carries instruction information used to instruct the terminal device to establish a connection to the SN by using a radio resource configuration corresponding to the SUL carrier/common UL carrier), and after receiving the reconfiguration message, the terminal device communicates with the SN by using the new configuration.

In this case, if the downlink measurement result, RSRP, of the cell (the PSCell and/or the SCell) of the secondary station is still lower than the threshold in the first reconfiguration message, or the terminal device does not receive the second reconfiguration message, the terminal device communicates with the SN by using the radio resource configuration that is corresponding to the SUL carrier and that is included in the first RRC connection reconfiguration message.

For configuration manner (1) in which the measurement result is higher than the threshold, the radio resource configuration corresponding to the common UL carrier is added to the secondary station adding request acknowledgment message. After receiving the secondary station adding request acknowledgment message, the MN adds the radio resource configuration corresponding to the common UL carrier to the first RRC connection reconfiguration message. After receiving the first reconfiguration message, the terminal device establishes an RRC connection to the SN by using the radio resource configuration corresponding to the common UL carrier (for example, performing random access to the primary secondary cell PSCell of the secondary station by using a dedicated RACH configuration of the common UL carrier and transmitting data to or receiving data from the secondary station by using a configuration such as a PUCCH/PUSCH configuration of the common UL carrier); and establishes a DC mode with the MN and the SN.

If the network side changes the configuration policy, the MN/SN sends the second reconfiguration message to the terminal device (for example, the second reconfiguration message includes an updated radio resource configuration corresponding to the common UL carrier (for example, a new radio resource configuration is configured for the common UL carrier), or includes the radio resource configuration corresponding to the SUL carrier (when the common UL carrier is overloaded or the downlink measurement result becomes worse (lower than the threshold), the network side determines to enable the terminal device to communicate with the SN by using the radio resource configuration corresponding to the SUL carrier. If there is more than one SUL, a plurality of SULs are configured. A radio resource configuration is configured for each SUL carrier, and the network device (MN/SN) specifies a radio resource configuration, for use by the terminal device, of a specific SUL carrier, or the terminal device selects a radio resource configuration by itself)). After receiving the second reconfiguration message, the terminal device communicates with the SN by using a corresponding configuration.

For configuration manner (2) in which the measurement result is higher than the threshold, the SN adds the radio resource configurations corresponding to the common UL carrier and the SUL carrier to the secondary station adding request acknowledgment message, and the SN instructs the terminal device to establish an RRC connection to the SN by using the radio resource configuration of a specific carrier (the SUL carrier or the common UL carrier). After receiving the secondary station adding request acknowledgment message, the MN adds the dedicated radio resource configurations corresponding to the common UL carrier and the SUL carrier to the first RRC connection reconfiguration message. Optionally, the first RRC connection reconfiguration message may include instruction information used to instruct the terminal device to establish a connection to the SN by using a radio resource configuration corresponding to a specific carrier.

Optionally, the secondary station adding request acknowledgment message/first RRC connection reconfiguration message includes a threshold used for uplink carrier selection. After receiving the first RRC connection reconfiguration message, the terminal device performs further determining based on the threshold and a downlink measurement result, obtained through measurement, of a cell (the PSCell and/or the SCell) of the secondary station. If the downlink measurement result is lower than the threshold, the terminal device communicates with the SN by using the radio resource configuration corresponding to the SUL carrier. Alternatively, the MN/SN sends the second reconfiguration message to the terminal device (for example, the reconfiguration message includes an updated radio resource configuration corresponding to the SUL carrier (for example, when there is more than one SUL carrier, an SUL is changed; or when there is only one SUL carrier, a new radio resource configuration is configured for the SUL carrier) and/or an updated radio resource configuration of the common UL carrier, and includes instruction information used to instruct the terminal device to establish a connection to the SN by using a radio resource configuration corresponding to a specific carrier). After receiving the reconfiguration message, the terminal device communicates with the SN based on indication by using the new configuration.

Therefore, in this embodiment of this application, in the scenario of DC, when the secondary station supports the SUL carrier (for example, when the SUL carrier is configured for the primary secondary cell PSCell or the SCell of the secondary station), the secondary base station may perform resource configuration based on the measurement result of the cell of the secondary base station from the terminal device and the threshold. The resource configuration includes resource configuration information of at least one uplink carrier, and the at least one uplink carrier herein includes the common UL carrier or the SUL carrier. After receiving the resource configuration information of the at least one uplink carrier, the terminal device may determine, from the at least one uplink carrier, one target carrier for access, to implement dual connections to the MN and the SN.

FIG. 6 is a schematic flowchart of a method for adding a secondary station according to an embodiment of this application. It should be understood that FIG. 6 shows steps or operations of adding a secondary station. However, these steps or operations are merely examples. Other operations or variants of the operations in FIG. 6 may alternatively be performed in this embodiment of this application. In addition, the steps in FIG. 6 may be performed in a sequence different from that shown in FIG. 6, and possibly, not all operations in FIG. 6 need to be performed. In this embodiment of this application, an MN and an SN may be devices having functions same as or similar to those shown in FIG. 5.

610. The SN sends a threshold to the MN.

Specifically, the SN may send, to the MN in advance over an X2/Xn interface, a threshold used for uplink carrier selection. Specifically, for the threshold herein, refer to the foregoing description of the threshold. To avoid repetition, details are not described again.

620. A terminal device sends a measurement report to the MN. Specifically, for the measurement report, refer to the foregoing description. To avoid repetition, details are not described again.

Herein, a logical sequence of step 610 and a logical sequence of step 620 are interchangeable. To be specific, the SN may send the threshold to the MN before or after the terminal device sends the measurement report to the MN.

630. The MN determines a configuration of the SN based on the threshold and a measurement result.

After receiving the measurement report sent by the terminal device and the threshold sent by the SN, the MN determines the configuration of the SN based on the threshold and the measurement result. The measurement result herein includes cell-level RSRP and/or cell-level RSRQ, or includes a beam-level measurement result, RSRP and/or RSRQ, of the cell.

Specifically, if the measurement result is lower than the threshold, the MN may instruct the SN to configure a radio resource only for the SUL carrier.

If the measurement result is higher than the threshold, the MN may instruct the SN to configure a radio resource only for a common UL carrier. Alternatively, the MN may instruct the SN to configure a radio resource configuration for both the SUL carrier and the common UL carrier.

640. The MN sends a secondary station adding request to the SN.

When the MN indicates that the SN configures a radio resource only for the SUL carrier, the MN adds indication information to a secondary station adding request message, where the indication information is used to indicate that the SN configures the radio resource only for the SUL carrier.

When the MN indicates that the SN configures a radio resource only for the common UL carrier, the MN adds indication information to the secondary station adding request, where the indication information is used to indicate that the SN configures the radio resource only for the common UL carrier.

When the MN indicates that the SN configures a radio resource for both the SUL carrier and the common UL carrier, the MN adds indication information to the secondary station adding request, where the indication information is used to indicate that the SN configures the radio resource for both the SUL carrier and the common UL carrier.

650. The SN sends a secondary station adding request response to the MN.

When the secondary station adding request message includes indication information used to indicate that the SN configures a radio resource configuration only for the SUL carrier, the SN configures the radio resource configuration only for the SUL carrier. For example, the radio resource configuration includes a dedicated RACH configuration, where the dedicated RACH configuration includes a preamble index and a time-frequency resource, and may further include at least one of a PUCCH configuration, a PUSCH configuration, and an uplink power control configuration. Correspondingly, the SN adds the radio resource configuration corresponding to the SUL carrier to the secondary station adding request acknowledgment message.

When the secondary station adding request message includes indication information used to indicate that the SN configures a radio resource configuration only for the common UL carrier, the SN configures the radio resource configuration only for the common UL carrier. For example, the radio resource configuration includes a dedicated RACH configuration, where the dedicated RACH configuration includes a preamble index and a time-frequency resource, and may further include at least one of a PUCCH configuration, a PUSCH configuration, and an uplink power control configuration. Correspondingly, the SN adds the radio resource configuration of the common UL carrier to the secondary station adding request acknowledgment message.

When the secondary station adding request message includes indication information used to indicate that the SN configures a radio resource configuration for both the SUL carrier and the common UL carrier, the SN adds radio resource configurations corresponding to the common UL carrier and the SUL carrier to the secondary station adding request acknowledgment message. For example, the radio resource configuration includes a dedicated RACH configuration, where the dedicated RACH configuration includes a preamble index and a time-frequency resource, and may further include at least one of a PUCCH configuration, a PUSCH configuration, and an uplink power control configuration. In addition, the SN indicates a carrier (the SUL carrier or the common UL carrier) corresponding to a radio resource configuration used by the terminal device to establish an RRC connection to the SN.

660. The MN sends an RRC connection reconfiguration message to the terminal device.

When the secondary station adding request acknowledgment message indicates that the SN configures the radio resource configuration only for the SUL carrier, the MN adds the radio resource configuration corresponding to the SUL carrier to a first RRC connection reconfiguration message. After receiving the first reconfiguration message, the terminal device establishes the RRC connection to the SN by using the radio resource configuration corresponding to the SUL carrier, for example, performing random access to a primary secondary cell PSCell of the secondary station by using a dedicated RACH configuration of the SUL carrier and transmitting data to or receiving data from the secondary station by using a configuration such as a PUCCH/PUSCH configuration of the SUL carrier; and establishes a DC mode with the MN and the SN.

If a network side changes a configuration policy, the MN or the SN sends a second reconfiguration message to the terminal device. For example, the second reconfiguration message includes an updated radio resource configuration corresponding to the SUL carrier. For example, when there is more than one SUL carrier, an SUL carrier is changed, or when there is only one SUL carrier, a new radio resource configuration is configured for the SUL carrier. Alternatively, the second reconfiguration message includes the radio resource configuration corresponding to the common UL carrier (when a downlink measurement result becomes better (higher than the threshold), the network side determines to enable the terminal device to communicate with the SN by using the radio resource configuration corresponding to the common UL carrier)). After receiving the second reconfiguration message, the terminal device communicates with the SN by using the new configuration.

When the secondary station adding request acknowledgment message indicates that the SN configures the radio resource configuration only for the common UL carrier, the radio resource configuration of the common UL carrier is added to the first RRC connection reconfiguration message. After receiving the first reconfiguration message, the terminal device establishes the RRC connection to the SN by using the radio resource configuration corresponding to the common UL carrier, for example, performing random access to a primary secondary cell PSCell of the secondary station by using a dedicated RACH configuration of the common UL carrier and transmitting data to or receiving data from the secondary station by using a configuration such as a PUCCH/PUSCH configuration of the common UL carrier; and establishes a DC mode with the MN and the SN.

If the network side changes the configuration policy, the MN/SN sends second reconfiguration message to the terminal device. For example, the second reconfiguration message includes an updated radio resource configuration corresponding to the common UL carrier, for example, a new radio resource configuration is configured for the common UL carrier; or includes the radio resource configuration corresponding to the SUL carrier. When the common UL carrier is overloaded or the downlink measurement result becomes worse (lower than the threshold), the network side determines to enable the terminal device to communicate with the SN by using the radio resource configuration corresponding to the SUL carrier. If there is more than one SUL, a plurality of SULs are configured. A radio resource configuration is configured for each SUL carrier, and the network side specifies a radio resource configuration, for use by the terminal device, of a specific SUL carrier, or the terminal device selects a radio resource configuration by itself. After receiving the second reconfiguration message, the terminal device communicates with the SN by using a corresponding configuration.

When the secondary station adding request acknowledgment message indicates that the SN configures a radio resource configuration for both the SUL carrier and the common UL carrier, dedicated radio resource configurations corresponding to the common UL carrier and the SUL carrier is added to the first RRC connection reconfiguration message, and optionally, the first RRC connection reconfiguration message may further include instruction information used to instruct the terminal device to establish a connection to the SN by using a radio resource configuration corresponding to a specific carrier.

Optionally, the secondary station adding request acknowledgment message or the first RRC connection reconfiguration message includes a threshold used for UL carrier selection. After receiving the first RRC connection reconfiguration message, the terminal device performs further determining based on the threshold and a downlink measurement result, obtained through measurement, of a cell (the PSCell and/or the SCell) of the secondary station. If the downlink measurement result is lower than the threshold, the terminal device communicates with the SN by using the radio resource configuration corresponding to the SUL carrier. Alternatively, the MN/SN sends the second reconfiguration message to the terminal device. For example, the reconfiguration message includes an updated radio resource configuration corresponding to the SUL carrier (for example, when there is more than one SUL carrier, an SUL carrier is changed; or when there is only one SUL carrier, a new radio resource configuration is configured for the SUL carrier) and/or an updated radio resource configuration of the common UL carrier, and includes instruction information used to instruct the terminal device to establish a connection to the SN by using a radio resource configuration corresponding to a specific carrier. After receiving the reconfiguration message, the terminal device communicates with the SN based on indication by using the new configuration.

Therefore, in this embodiment of this application, in a DC scenario, when the secondary station supports the SUL carrier (for example, the SUL carrier is configured for the primary secondary cell PSCell or the SCell of the secondary station), the MN may select at least one carrier based on the measurement result of the cell of the SN from the terminal device and the threshold sent by the SN, and instruct the SN to configure the at least one carrier. Then the SN determines resource configuration information of the at least one uplink carrier. Herein, the at least one uplink carrier determined by the SN herein includes the common UL carrier and/or the SUL carrier. After receiving the determined resource configuration information of the at least one uplink carrier, the terminal device may determine, from the at least one uplink carrier, one target carrier for access, to implement dual connections to the MN and the SN.

Figure 7:
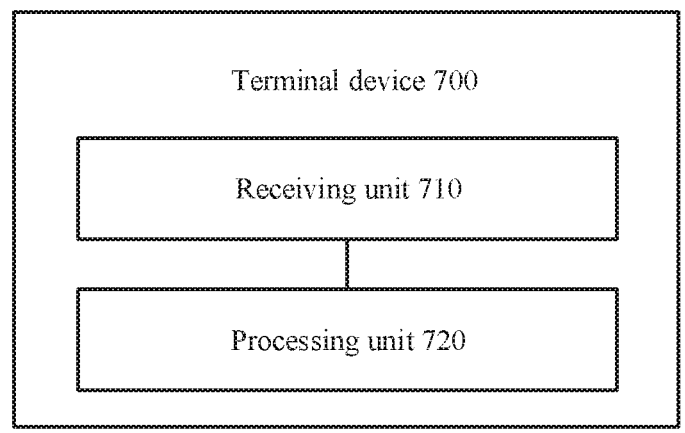
FIG. 7 is a schematic flowchart of a terminal device according to an embodiment of this application.

FIG. 7 is a schematic block diagram of a terminal device 700 according to an embodiment of this application. The terminal device 700 includes a receiving unit 710 and a processing unit 720.

The receiving unit 710 is configured to receive indication information sent by a network device. The indication information is used to indicate resource configuration information of at least one uplink carrier, the at least one uplink carrier includes a first uplink carrier and/or at least one second uplink carrier, the first uplink carrier and the at least one second uplink carrier are different uplink carriers in a cell of the network device, and the first uplink carrier and the at least one second uplink carrier are corresponding to one downlink carrier in the cell.

For example, the indication information is used to indicate resource configuration information of the first uplink carrier or resource configuration information of the second uplink carrier, the first uplink carrier and the second uplink carrier are different uplink carriers in a cell of the network device, and the first uplink carrier and the second uplink carrier are corresponding to one downlink carrier in the cell.

The processing unit 720 is configured to determine, based on the resource configuration information of the at least one uplink carrier, one uplink carrier from the at least one uplink carrier as a target carrier for performing random access.

For example, the processing unit 720 is configured to determine the target carrier based on the indication information, and the processing unit 720 is further configured to initiate random access by using the target carrier.

Optionally, the indication information is carried in a reconfiguration message used for synchronization, the reconfiguration message used for synchronization includes the resource configuration information of the first uplink carrier and the resource configuration information of the second uplink carrier, and when the resource configuration information does not include a dedicated random access resource, the processing unit is specifically configured to:

if determining that a measurement result of a downlink reference signal is greater than or equal to a threshold, determine the first uplink carrier as the target carrier; or if determining that a measurement result of a downlink reference signal is less than a threshold, determine the second uplink carrier as the target carrier.

Optionally, the resource configuration information of the first uplink carrier includes at least one of a physical uplink shared channel PUSCH configuration, a physical uplink control channel PUCCH configuration, a sounding reference signal SRS configuration, and an uplink power control configuration of the first uplink carrier, and the resource configuration information of the second uplink carrier includes at least one of a PUSCH configuration, a PUCCH configuration, an SRS configuration, and an uplink power control configuration of the second uplink carrier.

Optionally, the reconfiguration message used for synchronization further includes the threshold.

Optionally, the resource configuration information includes a dedicated random access resource, and the processing unit 720 is specifically configured to:

determine, based on the indication information, the at least one uplink carrier corresponding to the dedicated random access resource; and if the at least one uplink carrier includes one uplink carrier, determine the uplink carrier as the target carrier; or if the at least one uplink carrier includes at least two uplink carriers, determine one of the at least two uplink carriers as the target carrier.

Optionally, the indication information includes a carrier index corresponding to the dedicated random access resource. The processing unit 720 is specifically configured to determine a carrier indicated by the carrier index corresponding to the dedicated random access resource, as the at least one uplink carrier corresponding to the dedicated random access resource.

Optionally, there is a correspondence between the dedicated random access resource and an uplink carrier on which a physical uplink control channel PUCCH resource is configured. The processing unit 720 is specifically configured to determine, based on a correspondence between the dedicated random access resource and an uplink carrier on which the PUCCH resource is configured, the at least one uplink carrier corresponding to the dedicated random access resource.

Optionally, the resource configuration information further includes a PUCCH resource, and the processing unit 720 is specifically configured to:

determine one of uplink carriers, on which the PUCCH resource is configured, of the at least two uplink carriers as the target carrier.

Optionally, the resource configuration information further includes a common random access resource, and if the terminal device fails to perform contention-free random access on the target carrier by using the dedicated random access resource, the terminal device performs contention-based random access on the target carrier or another uplink carrier different from the target carrier by using the common random access resource.

Optionally, the resource configuration information includes a PUCCH resource, and the processing unit 720 is specifically configured to:

determine one of uplink carriers, on which the PUCCH resource is configured, of the at least one uplink carrier as the target carrier.

Optionally, the processing unit 720 is specifically configured to: when there is one uplink carrier on which the PUCCH resource is configured, determine the uplink carrier on which the PUCCH resource is configured as the target carrier; or when there are at least two uplink carriers on which the PUCCH resource is configured, determine the target carrier based on a measurement result of the cell.

Optionally, the resource configuration information includes a common random access resource, and the processing unit 720 is specifically configured to:

determine the target carrier from the at least one uplink carrier based on the measurement result of the cell.

Optionally, the measurement result includes a measurement result of a downlink reference signal, and the processing unit 720 is specifically configured to:

if the measurement result of the downlink reference signal is greater than or equal to a threshold, determine the first uplink carrier as the target carrier, or if the measurement result of the downlink reference signal is less than the threshold, determine the second uplink carrier as the target carrier.

Optionally, after the terminal device initiates random access on the target carrier in a power ramping manner for X times, or after the terminal device fails to initiate random access on the target carrier for Y times, or the terminal device sends a random access preamble sequence on the target carrier for Z times, the terminal device performs random access on another uplink carrier different from the target carrier, where X, Y, and Z are all positive integers greater than 1.

Figure 8:
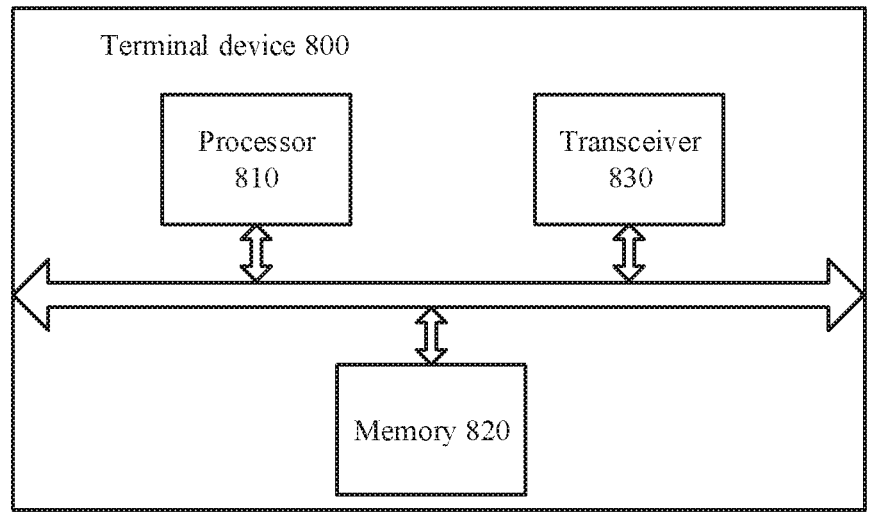
FIG. 8 is a schematic flowchart of another terminal device according to an embodiment of this application.

It should be noted that in this embodiment of this application, the receiving unit 710 may be implemented by a transceiver, and the processing unit 720 may be implemented by a processor. As shown in FIG. 8, a terminal device 800 may include a processor 810, a memory 820, and a transceiver 830. The memory 820 may be configured to store, for example, code executed by the processor 810. The processor 810 may be configured to process data or a program.

In an implementation process, steps in the foregoing methods can be implemented by using a hardware integrated logical circuit in the processor 810, or by using instructions in a form of software. The steps of the method disclosed with reference to the embodiments of this application may be directly performed by a hardware processor, or may be performed by using a combination of hardware in the processor and a software module. A software module may be located in a storage medium mature in the art, such as a random access memory, a flash memory, a read-only memory, a programmable read-only memory, an electrically erasable programmable memory, or a register. The storage medium is located in the memory 820, and the processor 810 reads information in the memory 820 and completes the steps in the foregoing methods in combination with hardware of the processor 810. To avoid repetition, details are not described again.

The terminal device 700 shown in FIG. 7 or the terminal device 800 shown in FIG. 8 can implement processes corresponding to the foregoing method embodiments. Specifically, for the terminal device 700 or the terminal device 800, refer to the foregoing description. To avoid repetition, details are not described again.

Figure 9:
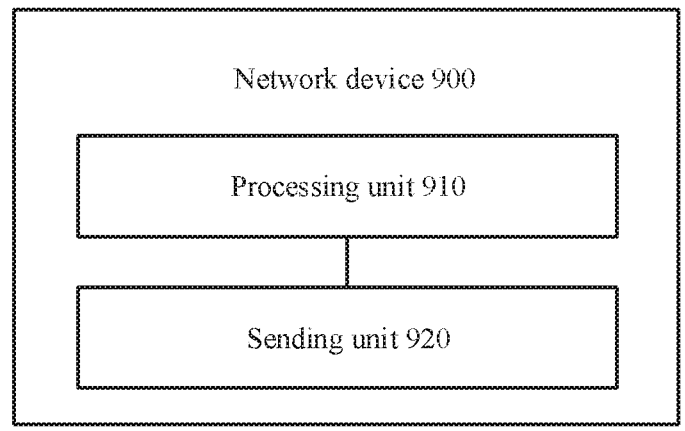
FIG. 9 is a schematic flowchart of a network device according to an embodiment of this application.

FIG. 9 is a schematic block diagram of a network device 900 according to an embodiment of this application. The network device 900 may include a processing unit 910 and a sending unit 920.

The processing unit 910 is configured to determine first indication information. The first indication information is used to indicate resource configuration information of at least one uplink carrier, the at least one uplink carrier includes a first uplink carrier and/or at least one second uplink carrier, the first uplink carrier and the at least one second uplink carrier are different uplink carriers in a cell of the network device 900, and the first uplink carrier and the at least one second uplink carrier are corresponding to one downlink carrier in the cell.

For example, the first indication information is used to indicate resource configuration information of the first uplink carrier or resource configuration information of the second uplink carrier, the first uplink carrier and the second uplink carrier are different uplink carriers in a cell of the apparatus, and the first uplink carrier and the second uplink carrier are corresponding to one downlink carrier in the cell.

The sending unit 920 is configured to send the first indication information, so that the terminal device determines one uplink carrier from the at least one uplink carrier, as a target carrier for performing random access.

Optionally, the first indication information is carried in a reconfiguration message used for synchronization, and the reconfiguration message used for synchronization includes the resource configuration information of the first uplink carrier and the resource configuration information of the second uplink carrier, or the reconfiguration message used for synchronization includes the configuration information of the first uplink carrier or the configuration information of the second uplink carrier.

Optionally, the configuration information of the first uplink carrier includes at least one of a physical uplink shared channel (PUSCH) configuration, a physical uplink control channel (PUCCH) configuration, a sounding reference signal (SRS) configuration, and an uplink power control configuration of the first uplink carrier. The configuration information of the second uplink carrier includes at least one of a physical uplink shared channel (PUSCH) configuration, a physical uplink control channel (PUCCH) configuration, a sounding reference signal (SRS) configuration, and an uplink power control configuration of the second uplink carrier.

Optionally, the reconfiguration message used for Synchronization further includes a threshold, and the threshold is used by the terminal device to determine the target carrier based on the measurement result of the downlink reference signal.

Optionally, the first indication information is used to indicate resource configuration information of the target carrier.

The network device 900 further includes a receiving unit, configured to receive a measurement result of the cell from the terminal device.

The processing unit 910 is specifically configured to determine the target carrier from the at least one uplink carrier based on the measurement result received by the receiving unit.

Optionally, the measurement result includes a measurement result of a downlink reference signal, and the processing unit 910 is specifically configured to:

if the measurement result of the downlink reference signal is greater than or equal to a threshold, determine the first uplink carrier in the at least one uplink carrier as the target carrier; or if the measurement result of the downlink reference signal is less than the threshold, determine the second uplink carrier in the at least one uplink carrier as the target carrier.

Optionally, the resource configuration information includes a dedicated random access resource and/or a PUCCH resource, where the first indication information includes a carrier index corresponding to the dedicated random access resource, and the carrier index corresponding to the dedicated random access resource is used to indicate at least one uplink carrier corresponding to the dedicated random access resource; or there is a correspondence between the dedicated random access resource and an uplink carrier on which a physical uplink control channel PUCCH resource is configured, and the correspondence is used to indicate at least one uplink carrier corresponding to the dedicated random access resource.

Optionally, the first indication information further includes a common random access resource.

Optionally, the sending unit 920 is further configured to send second indication information to the terminal device. The second indication information is used to indicate that after the terminal device initiates random access on the target carrier in a power ramping manner for X times, or after the terminal device fails to initiate random access on the target carrier for Y times, or after the terminal device sends a random access preamble sequence on the target carrier for Z times, the terminal device performs random access on another uplink carrier different from the target carrier, where X, Y, and Z are all positive integers greater than 1.

Figure 10:
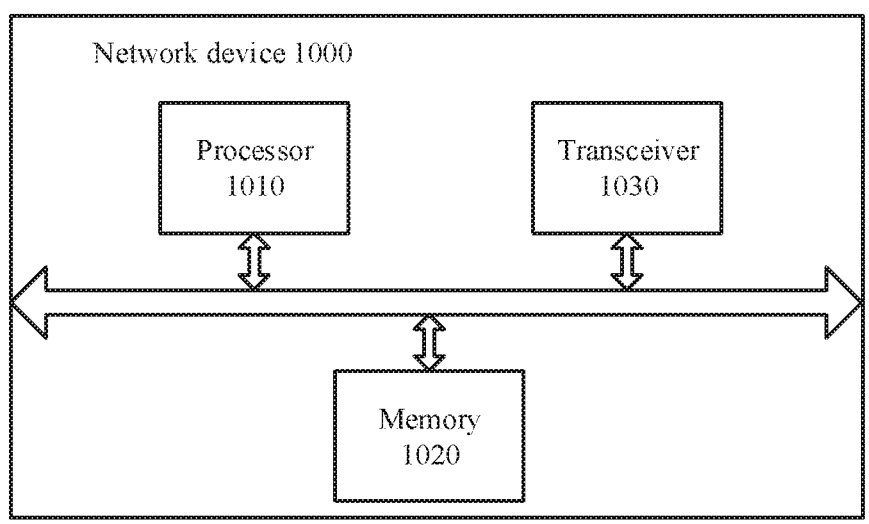
FIG. 10 is a schematic flowchart of another network device according to an embodiment of this application.

It should be noted that in this embodiment of this application, the processing unit 910 may be implemented by a processor, and the sending unit 920 may be implemented by a transceiver. As shown in FIG. 10, a network device 1000 may include a processor 1010, a memory 1020, and a transceiver 1030. The memory 1020 may be configured to store, for example, code executed by the processor 1010. The processor 1010 may be configured to process data or a program.

In an implementation process, steps in the foregoing methods can be implemented by using a hardware integrated logical circuit in the processor 1010, or by using instructions in a form of software. The steps of the method disclosed with reference to the embodiments of this application may be directly performed by a hardware processor, or may be performed by using a combination of hardware in the processor and a software module. A software module may be located in a storage medium mature in the art, such as a random access memory, a flash memory, a read-only memory, a programmable read-only memory, an electrically erasable programmable memory, or a register. The storage medium is located in the memory 1020, and the processor 1010 reads information in the memory 1020 and completes the steps in the foregoing methods in combination with hardware of the processor 1010. To avoid repetition, details are not described again.

The network device 900 shown in FIG. 9 or the network device 1000 shown in FIG. 10 can implement processes corresponding to the foregoing method embodiments. Specifically, for the network device 900 or the network device 1000, refer to the foregoing description. To avoid repetition, details are not described again.

An embodiment of this application further provides a computer readable medium, configured to store a computer program. The computer program includes an instruction used to execute the method corresponding to the terminal device or the network device in the foregoing method embodiment.

An embodiment of this application further provides a computer program product. The computer program product includes computer program code. When the computer program code is run by a communications unit, a processing unit or a transceiver, and a processor of a communications device (for example, the foregoing terminal device or the foregoing network device), the communications device executes the method corresponding to the terminal device or the network device in the foregoing method embodiment.

An embodiment of this application further provides a communications chip. The communications chip stores an instruction, and when the instruction is run on a communications apparatus, the communications chip is enabled to execute the method corresponding to the terminal device or the network device in the foregoing method embodiment.

An embodiment of this application further provides a communications system. The communications system includes the foregoing terminal device and the foregoing network device. In addition, the communications system in this embodiment of this application may be in a handover scenario or a dual connectivity scenario. When the communications system is in the handover scenario, the communications system includes the terminal device, the source network device, and the target network device. When the communications system is in the dual connectivity scenario, the communications system includes the foregoing terminal device, the foregoing master base station, and the foregoing secondary base station.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described again.

In the several embodiments provided in this application, it should be understood that the disclosed system, apparatus, and method may be implemented in other manners. For example, the described apparatus embodiment is merely an example. For example, the unit division is merely logical function division, or may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
  receiving, by a terminal device, indication information from a network device, wherein the indication information indicates resource configuration information of a first uplink carrier and resource configuration information of a second uplink carrier, wherein the indication information comprises a carrier index corresponding to a dedicated random access resource, wherein the first uplink carrier and the second uplink carrier are different uplink carriers in a cell of the network device, and wherein the first uplink carrier and the second uplink carrier are corresponding to one downlink carrier in the cell;
  in response to that the resource configuration information of one of the first uplink carrier or the second uplink carrier comprises the dedicated random access resource, determining, by the terminal device, an uplink carrier between the first uplink carrier and the second uplink carrier as a target carrier, wherein the target carrier is indicated by the carrier index corresponding to the dedicated random access resource; and
  initiating, by the terminal device, random access by using the target carrier.

2. The method according to claim 1, wherein, when neither the resource configuration information of the first uplink carrier nor the resource configuration information of the second uplink carrier comprises a dedicated random access resource, the method comprises:
  in response to that a measurement result of a downlink reference signal is greater than or equal to a threshold, determining, by the terminal device, the first uplink carrier as the target carrier; or
  in response to that a measurement result of a downlink reference signal is less than a threshold, determining, by the terminal device, the second uplink carrier as the target carrier.

3. The method according to claim 1, wherein the resource configuration information of one of the first uplink carrier and the second uplink carrier comprises at least one of a physical uplink shared channel (PUSCH) configuration, a physical uplink control channel (PUCCH) configuration, or a sounding reference signal (SRS) configuration.

4. The method according to claim 2, wherein the threshold is carried in a system message or a handover message from the network device.

5. The method according to claim 1, wherein the second uplink carrier has an uplink frequency band with a frequency lower than that of the first uplink carrier.

6. The method according to claim 1, wherein the method comprises:
  determining, by the terminal device based on a correspondence between the dedicated random access resource and an uplink carrier on which a physical uplink control channel (PUCCH) resource is configured, the uplink carrier configured with the dedicated random access resource is the target carrier.

7. The method according to claim 1, wherein the resource configuration information of the first uplink carrier and the resource configuration information of the second uplink carrier comprises a common random access resource, and the method further comprises:
  if the terminal device fails to perform contention-free random access on the target carrier by using the dedicated random access resource, performing, by the terminal device, contention-based random access on the target carrier or another uplink carrier different from the target carrier by using the common random access resource.

8. A communication method, comprising:
  determining, by a network device, indication information, wherein the indication information indicates resource configuration information of a first uplink carrier and resource configuration information of a second uplink carrier, wherein the resource configuration information of one of the first uplink carrier and the second uplink carrier comprises a dedicated random access resource configured for one of the first uplink carrier and the second uplink carrier, wherein the resource configuration information comprises at least one of a dedicated random access resource or a physical uplink control channel (PUCCH) resource, wherein the first uplink carrier and the second uplink carrier are different uplink carriers in a cell of the network device, and wherein the first uplink carrier and the second uplink carrier are corresponding to one downlink carrier in the cell; and sending, by the network device, the indication information to a terminal device, wherein the indication information indicates a target carrier for initiating random access, and wherein:
  the indication information comprises a carrier index corresponding to the dedicated random access resource, wherein the carrier index corresponding to the dedicated random access resource is used to indicate the target carrier; or
  there is a correspondence between the dedicated random access resource and an uplink carrier on which a PUCCH resource is configured, wherein the correspondence is used to indicate the target carrier.

9. The method according to claim 8, further comprises:
sending a threshold to the terminal device via a system message or a handover message, wherein the threshold is used by the terminal device to determine the target carrier based on a measurement result of a downlink reference signal.

10. The method according to claim 8, wherein the indication information indicates resource configuration information of the target carrier, wherein the determining, by a network device, indication information comprises:
  receiving, by the network device, a measurement result of the cell from the terminal device; and
  determining, by the network device, the target carrier based on the measurement result.

11. The method according to claim 10, wherein the measurement result comprises a measurement result of a downlink reference signal, and wherein the determining, by the network device, the target carrier based on the measurement result comprises:
  in response to the measurement result of the downlink reference signal is greater than or equal to a threshold, determining, by the network device, the first uplink carrier as the target carrier; or
  in response to the measurement result of the downlink reference signal is less than the threshold, determining, by the network device, the second uplink carrier as the target carrier.

12. An apparatus, comprising:
a memory, configured to store a computer program; and
at least one processor, wherein the computer program, when executed by the at least one processor, instruct the at least one processor to perform operations comprising:
  receiving indication information from a network device, wherein the indication information indicates resource configuration information of a first uplink carrier and resource configuration information of a second uplink carrier, wherein the indication information comprises a carrier index corresponding to a dedicated random access resource, wherein the first uplink carrier and the second uplink carrier are different uplink carriers in a cell of the network device, and wherein the first uplink carrier and the second uplink carrier are corresponding to one downlink carrier in the cell;
  in response to that the resource configuration information of one of the first uplink carrier or the second uplink carrier comprises the dedicated random access resource, determining an uplink carrier between the first uplink carrier and the second uplink carrier as a target carrier, wherein the target carrier is indicated by the carrier index corresponding to the dedicated random access resource; and
  initiating random access by using the target carrier.

13. The apparatus according to claim 12, wherein, when neither the resource configuration information of the first uplink carrier nor the resource configuration information of the second uplink carrier comprises a dedicated random access resource, the operations comprise:
  in response to a measurement result of a downlink reference signal is greater than or equal to a threshold, determining the first uplink carrier as the target carrier; or
  in response to a measurement result of a downlink reference signal is less than a threshold, determining the second uplink carrier as the target carrier.

14. The apparatus according to claim 13, wherein the threshold is carried in a system message or a handover message from the network device.

15. The apparatus according to claim 12, wherein the resource configuration information of one of the first uplink carrier and the second uplink carrier comprises at least one of a physical uplink shared channel (PUSCH) configuration, a physical uplink control channel (PUCCH) configuration, a sounding reference signal (SRS) configuration, or an uplink power control configuration of the first uplink carrier.

16. The apparatus according to claim 12, wherein the resource configuration information of one of the first uplink carrier and the second uplink carrier further comprises a common random access resource, and wherein the operations further comprise:
  in response to failing to perform contention-free random access on the target carrier by using the dedicated random access resource, performing contention-based random access on the target carrier or another uplink carrier different from the target carrier by using the common random access resource.

17. The apparatus according to claim 12, wherein the operations further comprise:
  in response to initiating random access on the target carrier in a power ramping manner for X times, or in response to failing to initiate random access on the target carrier for Y times, or in response to sending a random access preamble sequence on the target carrier for Z times, performing random access on another uplink carrier different from the target carrier, wherein X, Y, and Z are all positive integers greater than 1.

18. The apparatus according to claim 12, wherein the operations comprise:
  determining, based on a correspondence between the dedicated random access resource and an uplink carrier on which a physical uplink control channel (PUCCH) resource is configured, the uplink carrier configured with the dedicated random access resource is the target carrier.

* * * * *